(12) United States Patent
Castelli et al.

(10) Patent No.: US 6,539,460 B2
(45) Date of Patent: Mar. 25, 2003

(54) SYSTEM AND METHOD FOR STORING DATA SECTORS WITH HEADER AND TRAILER INFORMATION IN A DISK CACHE SUPPORTING MEMORY COMPRESSION

(75) Inventors: Vittorio Castelli, Croton-on-Hudson, NY (US); Peter A. Franaszek, Mt. Kisco, NY (US); Philip Heidelberger, Cortlandt Manor, NY (US); John T. Robinson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 09/765,563

(22) Filed: Jan. 19, 2001

(65) Prior Publication Data

US 2002/0099907 A1 Jul. 25, 2002

(51) Int. Cl.[7] .............................................. G06F 12/00
(52) U.S. Cl. ........................ 711/154; 711/112; 711/114; 710/68
(58) Field of Search ................................. 711/104, 111, 711/112, 144, 170, 173, 118, 154; 710/68

(56) References Cited

U.S. PATENT DOCUMENTS

| | | | | |
|---|---|---|---|---|
| 4,868,738 A | * | 9/1989 | Kish et al. ................... | 711/202 |
| 5,729,228 A | | 3/1998 | Franaszek et al. ........... | 341/106 |
| 5,761,536 A | | 6/1998 | Franaszek .................... | 710/68 |
| 5,812,817 A | | 9/1998 | Hovis et al. ................. | 711/173 |
| 5,864,859 A | | 1/1999 | Franszek .................... | 707/101 |
| 5,867,114 A | * | 2/1999 | Barbir ........................ | 341/107 |
| 5,875,454 A | | 2/1999 | Craft et al. .................. | 711/113 |
| 6,032,197 A | * | 2/2000 | Birdwell et al. ............. | 709/247 |
| 6,127,953 A | * | 10/2000 | Manzardo .................... | 341/87 |
| 6,317,747 B1 | * | 11/2001 | Bolan et al. ................. | 707/101 |

OTHER PUBLICATIONS

"Disk Cache—Miss Ratio Analysis and Design Considerations", by Alan Jay Smith, ACM Transactions on Computer Systems, vol. 3, No. 3, Aug. 1985, pp. 161–203.
"On–line Data Compression in a Log–structured File System", by Michael, Burrows, et al., DEC Systems Research Center, 1992, pp. 2–9.
"Combining the concepts of Compression and Caching for a Two–Level Filesystem", Vincent Cate, et al., School of Computer Science, 1991, pp. 200–209.

* cited by examiner

Primary Examiner—Do Hyun Yoo
Assistant Examiner—Ngoc V Dinh
(74) Attorney, Agent, or Firm—Scully, Scott, Murphy & Presser; Derek S. Jennings, Esq.

(57) ABSTRACT

A computing system includes a storage server having a memory organization that includes a compressed memory device for storing sectors, each sector having a sector data portion and associated header and trailers, either attached by the hosts or by components of the computing system. The compressed memory device comprises a memory directory and a plurality of fixed-size blocks. The system implements a methodology for detaching headers and trailers from sectors before storing the sectors in the memory, and storing the headers and trailers in the memory disk cache, separate from the sector data portion; and, reattaching headers and trailers to sector data portions when the sectors are sent from the memory to a host or to a mass storage device. The header and trailer data are managed through the same memory directory used to manage the compressed main memory. The process of detaching headers and trailers from sectors for separate storage results in increased efficacy of data compression, thus yielding better compression ratios, and decreased memory traffic generated by host reads, host writes, cache stages and cache destages.

41 Claims, 17 Drawing Sheets

Servicing a Host Read Request

Servicing a Host Write Request

Stage Data to Cache

Destage Data from Cache

SYSTEM AND METHOD FOR STORING DATA SECTORS WITH HEADER AND TRAILER INFORMATION IN A DISK CACHE SUPPORTING MEMORY COMPRESSION

BACKGROUND OF THE INVENTION

1. Field of the Invention

This invention relates generally to storage server systems, for example, having a data cache where the data is maintained in compressed form, and particularly to an improved method for storing units of data in the data cache where the unit of storage is the size of a disk sector and headers and trailers having metadata and redundancy check information are employed.

2. Discussion of the Prior Art

Storage servers are computer systems functioning to manage securely and efficiently large amount of data stored on hard disks, optical disks, magnetic tapes or other forms of mass storage media.

FIG. 1 is a block diagram depicting the typical structure of a storage server device 100. As shown in FIG. 1, the storage server 100 is connected to the hosts via one or more host adapters 101, which performs the communication tasks required by the specific protocol of the selected interconnection network (e.g., Gigabit Ethernet, Token Ring or Fibre Channel). The host adapters 101 are connected to one or more processors or processor clusters 103 via a cluster interconnection network 102, which provides the media, protocols and services that ensure the communication between host adapters and processor clusters. To ensure continuous service in case of failure, usually a storage server has two or more processors or processor clusters 103, each operating across different power boundaries, so that lack of power at one cluster does not affect the rest of the system. Non Volatile Store (NVS) 107 may additionally be used to speed up write operations while maintaining high reliability. In medium-to-large size storage servers, processor clusters are used instead of individual processors. As known, processor clusters may be arranged, for instance, in a Symmetric Multi-Processor (SMP) configuration, where multiple processors share the same memory. The processor clusters provide all the functionality required to guarantee data integrity, including data recovery in case of failure. Each processor cluster is connected to one or more device adapters 104, which control the operations of hard disks, optical disks, magnetic tapes or other forms of mass storage media devices 105. Processor clusters may additionally share device adapters. The device adapters can provide additional data integrity functionality, such as RAID services.

The hosts served by a storage server are often heterogeneous. The data is transferred to and from the storage server in atomic units, which are usually pages containing 4 Kilobytes (KB) of data. Pages are usually divided into sectors, usually containing 512 Bytes of data, because a (disk) sector is the atomic unit of I/O supported by the disks. Some operating systems add headers or trailers to the sectors. For example as described in G. Soltis, "Inside the AS/400", Duke Press, Loveland CO, 1996, p.217, the operating system OS/400, which is the operating system of IBM AS/400, adds 8 Bytes of system header in front of each 512 Byte sector data, hence each sector contains 520 Bytes. To reduce the risk of data corruption, further headers or trailers may be added to the data within the storage server. For example, the host adapters can compute cyclic redundancy check bits and append them to each sector, further increasing the size of the sector, e.g., to 524 Bytes. The disk cache now may include simultaneously sectors of different size (but containing each 512 Bytes of sector data), depending on which type of host wrote them, which complicates its management. Alternatively, dummy headers and trailers may be appropriately added to sectors, so that all sectors now have the same size, and this approach wastes a small amount of space, but significantly simplifies the cache management.

While in the past 20 years the speed of processors has increased by a factor of 1000 or more, the speed of disks has barely increased by a factor of 3 to 4. Consequently, accessing data on disk is in general a very expensive operation in terms of latency. To hide part of the latency, in the storage server 100 of FIG. 1, a disk cache 106 may be employed, as taught, for instance, in the reference "Disk cache—miss ratio analysis and design considerations", ACM Trans. Comput. Syst. 3, (Aug. 1985), pp. 161–203. by A. J. Smith. A disk cache is a fast memory (for example DRAM) that contains a copy of part of the content of the data stored on disk. Usually, the most recently read part of the disk is stored in the disk cache, and prefetching algorithms can be used to load in the cache data with addresses close to those of the most recently read data. If a host request is for data contained in the cache (event called "cache hit"), the latency of the data transfer is equal to the time required to process the request plus the time to read the data from memory and transmit it. If the data is not in the cache ("cache miss"), then the time to serve the host request is dominated by the disk access latency. A cache miss can have latency of three to four order of magnitude larger than a cache hit.

As described in the above-mentioned reference to A. J. Smith, the larger the cache, the smaller is the miss rate, and the better the performance of the overall system. However, the cost of RAM is about two order of magnitude larger than the cost of disk for the same capacity, and the gap appears to be growing. It seems therefore beneficial to increase the capacity of the cache by compressing its content.

Compressed caches are taught in the art, for example, as described in U.S. Pat. No. 5,875,454, to D. J. Craft, R. Greenberg entitled Compressed DataCache Storage System. FIG. 2 illustrates an example of a system architecture for a compressed cache 200, for a processor accessing data at high speed and in small memory block units, and a mass storage medium holding data in large transfer units. Uncompressed data is read from a mass storage system 201 in large transfer units (e.g., 64K to 200K bytes). The data so received is divided into 4K blocks which are individually compressed through the use of a Lempel-Ziv-type of lossless compressor 202. The compressed 4K blocks are stored in the cache 203, in an integer, variable number of allocation units 204, which are fixed-size sections of contiguous memory, having size, for example, 512 bytes. The compressed block need not be stored in contiguous allocation units.

The actual locations within the cache of the first allocation unit for a transfer unit is recorded in the directory 205. The other allocation units for the transfer unit are connected through a linked list. When a read request is received via the I/O interface 208, the data is read from allocation units where the required block is stored, decompressed by a fast decompressor 207, and sent to the computer via the I/O interface 208. All the operations are controlled by a compressed data cache controller 206, which also maintains the cache directory 205, and performs the usual caching functions (such as replacing policies, free space management etc.).

One downside of the scheme described in U.S. Pat. No. 5,875,454, is the cost of the special-purpose hardware that needs to be developed, the use of a moderate speed compressor, and the use of a linked list to connect the allocation units for each transfer unit. However, the described prior art scheme is useful for moderate size caches (for example several MB, as described in U.S. Pat. No. 5,875,454). However, in an enterprise-class storage server, it is desirable to have disk caches having capacity equal to 0.1% to 2% of that of the entire disk subsystem. Typical sizes of the disk subsystem are in the order of terabytes, and are growing, hence the desired disk cache size is in the order of the Gigabytes to hundreds of Gigabytes, and will grow in the future. Additionally, such servers are designed to serve a large number of hosts. Hence, the compressor speed becomes very important, data integrity is essential, the management of the cache becomes more complex, and new services must be provided by the storage server. It is possible to combine a general-purpose computer with one or more special purpose compressed caches. However, a more cost-effective solution would be to use just general purpose hardware. In particular, cost-performance considerations suggest to use part of the main memory of the processor clusters as disk cache: for example, Symmetric Multi-Processors (SMPs) are designed to support large memories of the desired size, and a fast interface between the processors and the memory exists. SMPs and other parallel computer architectures provide the computing power necessary to provide the services and functionalities required for an enterprise class storage server. Hence, the disk cache 106 (FIG. 1) may be part of the computer cluster memory, rather than a separate device. The processor cluster has in general enough computing power to provide the functionalities that a hardware disk cache controller provides. If the memory of the computer cluster contains the disk cache, it is desirable that the speed of the compressor 202 be high enough to guarantee compression at a rate at least equal to the memory bandwidth.

Simple methods for compressing the main memory of a general purpose computer are known in the art, and are taught, for example, in U.S. Pat. No. 5,812,817, to W. P. Hovis et al. entitled in Compression Architecture for System Memory Applications. FIG. 3 illustrates the typical approach for compressing the main memory of a general purpose computer. As shown in FIG. 3, the memory of a conventional computer 301 is partitioned into an uncompressed cache directory portion 302, an uncompressed cache portion 303, a setup table portion 304 and a compressed storage portion 305. The part of the physical memory to be extended by compression typically includes portions 303, 304 and 305. The data contained in the part of the physical memory to be extended by compression are compressed and stored in the compressed storage portion 305. The location of each compressed piece is stored in the setup table 304. When the processor accesses the main memory, first the cache directory 302 is accessed to find if the desired addresses are stored in the uncompressed cache 303. If the data were contained in the uncompressed cache, the uncompressed cache is accessed, otherwise the setup table 304 is accessed to find the location of the desired addresses in the compressed storage 304. The compressed data is decompressed, stored in the uncompressed cache 303, the uncompressed cache directory 302 is updated, and the uncompressed cache is accessed by the processor. It should be understood that, with this method, the disk cache would be treated exactly like any other data: it would be compressed, and parts of it would be decompressed and stored in the uncompressed cache, when they are accessed.

The method proposed in above-referenced U.S. Pat. No. 5,812,817, to W. P. Hovis et al. does not describe how compression and decompression are accomplished, how the directory is structured, how the setup table is structured, nor how the compressed storage is managed.

Particularly, a fast compression/decompression algorithm is required. One such fast compression/decompression algorithm that may be employed is described in U.S. Pat. No. 5,729,228 to P. Franaszek, et al. entitled PARALLEL COMPRESSION AND DECOMPRESSION USING A COOPERATIVE DICTIONARY. Furthermore, in U.S. Pat. No. 5,864,859 to P. A. Franaszek entitled SYSTEM AND METHOD OF COMPRESSION AND DECOMPRESSION USING STORE ADDRESSING there is described a technique for dividing each memory page into a plurality of memory lines, to compress the lines to form compressed pages comprised of the lines that are placed in a random-access storage. A directory to the compressed pages is provided, wherein a location for a directory entry for each page is in a translation table between page virtual addresses and directory entries, and the beginning of descriptors of where the kth line within each page is stored is located at a fixed offset from the location of the directory entry. A set of descriptors are provided for each line, which indicate the storage locations for the compressed line. The compressed portions of each line is stored in a set of fixed-size blocks, which are not placed in the directory descriptor space.

The following three figures, FIG. 4, FIG. 5 and FIG. 6, illustrate prior art, that can be found in U.S. Pat. No. 5,761,536 to P. A. Franaszek entitled SYSTEM AND METHOD FOR REDUCING MEMORY FRAGMENTATION BY ASSIGNING REMAINDERS TO SHARE MEMORY BLOCKS ON A BEST FIT BASIS, and in co-pending U.S. pat. appln. No. Ser. 08/603,976, entitled COMPRESSION STORE ADDRESSING, and in co-pending U.S. patent application. Ser. No. 09/229,057 entitled METHOD AND APPARATUS FOR ADDRESSING MAIN MEMORY CONTENTS INCLUDING A DIRECTORY-STRUCTURE IN A COMPUTER SYSTEM the whole contents and disclosures of each of which are incorporated by reference as if fully set forth herein.

FIG. 4 depicts the general structure of a computer system with compressed main memory. Memory accesses from the processor 401 are served by a hierarchy of processor cache memories 402. Caches will access the main memory 405 upon cache misses, on writes or on cache line replacements. Memory accesses are mediated by a compression controller 403 which compresses data sent from the processor cache to the main memory and decompresses the data sent from the main memory to the processor cache. The Input/Output subsystem 404 also interfaces with the main memory through the compression controller.

FIG. 5 illustrates in greater detail the structure of the processor cache hierarchy 402, components of the compression controller 403, and compressed main memory 405. As shown in FIG. 5, the compressed main memory 405 is implemented using a conventional RAM memory, which is used to store a directory 501 and a number of fixed-size memory blocks 502. The processor cache 402 is implemented conventionally using a cache directory 503 for a set of cache lines 504. The compression controller 403 includes a decompressor 504 which is used for reading compressed lines from the compressed main memory to the processor cache, and a compressor 505 which is used to write processor cache lines into the compressed main memory. The content of each processor cache line is associated with a given real memory address 506. Unlike a conventional memory, however, the address 506 does not refer to an address in the memory. Rather, the address 506 is used to index into the directory 501. Each directory entry contains information which allows the associated cache line to be retrieved. For example, the directory entry 507 for line 1 associated with address A1 508 is for a line which has compressed to a degree in which the compressed line can be stored entirely within the directory entry. The directory entry 509 for line 2 associated with address A2 510 is for a line which is stored in compressed format using a first full memory block 511 and a second partially filled memory block 512. The directory entry 513 for line 3 associated with addresses A3 515 is for lines stored in compressed formats using a number of full memory blocks 517 and 518 and one shared memory block 519. The directory entry 514 for line 4 associated with addresses A4 516 is for lines stored in compressed format using one shared memory block 519.

FIG. 6 illustrates an example directory entry format 601. For this example, it is assumed that the memory blocks 502 of FIG. 5 are of size 256 bytes, and that the cache lines 504 of FIG. 5 are of size 1024 bytes. This means that line can be stored in an uncompressed format using four memory blocks. For this example, directory entries of size 16 bytes are used, in which the first byte consists of a number of flags; the contents of the first byte 601 determine the format of the remainder of the directory entry. A flag bit 602 specifies whether the line is stored in compressed or uncompressed format. If stored in uncompressed format, the remainder of the directory entry is interpreted as for line 1 606, in which four 30-bit addresses give the addresses in memory of the four blocks containing the line. If stored in compressed format, a flag bit 603 indicates whether the compressed line is stored entirely within the directory entry; if so, the format of the directory entry is as for line 3 608, in which up to 120 bits of compressed data are stored. Otherwise, for compressed lines longer than 120 bits, the formats shown for line 1 606 or line 2 607 may be used. In the case of the line 1 606 format, additional flag bits 604 specify the number of blocks used to store the compressed line, from one to four 30-bit addresses specify the locations of the blocks, and finally the size of the remainder, or fragment, of the compressed line stored in the last memory block (in units of 32 bytes), together with a bit indicating whether the fragment is stored at the beginning or at the end of the memory block, is given by four fragment information bits 605. Directory entry format 607 illustrates an alternative format in which part of the compressed line is stored in the directory entry (to reduce decompression latency); in this case, addresses to only the first and last blocks used to store the remaining part of the compressed line are stored in the directory entry, with intervening blocks (if any) found using a linked list technique, that is each blocked used to store the compressed line has, if required, a pointer field containing the address of the next memory block used to store the given compression line.

Main memory in paged memory systems is partitioned into pages, which have the same size (4K bytes=4096 bytes) as the pages transferred to and from disks. Most modern computer systems have paged memory systems, so it is reasonable to assume that the storage server will have a paged memory system. Compression and decompression then operates on pages or on lines, where the size of a page is an integer multiple of the size of a line. The size of a memory line can be equal to the size of a processor cache line or to a multiple of the size of a processor cache line. However, in the storage server, pages are composed of 8 sectors, each of which may contain more than 512 bytes, and therefore the cached disk pages are larger than the memory pages. This has several negative effects on the performance of the storage system if the main memory is compressed.

The first negative effect is an increase in memory traffic when a page is accessed. Consider for example the case where a memory line (the unit of compression/decompression) is 1024 Bytes long. A memory page includes four (4) lines. A disk page stored in the cache will span five (5) memory lines, and share at least one line with another disk page. In most cases, it will share two memory lines with other disk pages. There is an increase in traffic both during reads and during writes. During reads, five (5) memory lines must be decompressed to recover the disk page. During writes, the memory lines that the written disk page shares with other disk pages must first be decompressed, to reconstruct the original content, the disk page is then written in the appropriate locations, and 5 memory lines must then be compressed. Overall, this increases the response time of the system.

The second negative effect is on the compressibility of the data. The algorithms commonly used for compression rely on redundancy in the data, often at the byte level, to reduce its size. In particular, Lempel-Ziv-like algorithms look for repeated patterns in the data. Headers and trailers contain information that is unrelated to the patterns present in the data. They would also occur in any positions within a memory line, and a 1024 Byte long memory line will usually contain two headers and two trailers, and only occasionally only one header and one trailer. Not only do headers and trailers not compress well, but they also perturb the patterns of the data. Finally, for most memory pages, one of the four memory lines contains sectors belonging to two different disk pages, which results in an abrupt change of patterns at some point within the memory line, and can significantly decrease the compressibility of the data.

It would therefore be highly desirable to provide a system and method for efficiently implementing a disk cache on a computer system supporting main memory compression.

It would be further highly desirable to provide, in a computer system having a compressed disk cache memory and implementing a compressed memory directory for managing the compressed disk cache, a system for efficiently managing use and storage of headers and trailers through the compressed memory directory in a manner that avoids the negative effects resulting from a compressible disk cache system.

It would additionally be highly desirable to provide, in a computer system implementing a compressed disk cache memory, a system and method for detaching headers and trailers from sectors before storing the sectors in the disk cache, storing the headers and trailers, and, reattaching the headers and trailers to sectors when the sectors are sent from the disk cache to a host or to a mass storage device.

SUMMARY OF THE INVENTION

It is an object of the present invention to provide a system and method for efficiently implementing a disk cache on a computer system supporting main memory compression.

It is a further object of the present invention to provide, in a computer system having a compressed disk cache memory and implementing a compressed memory directory for managing the compressed disk cache, a system for efficiently managing use and storage of headers and trailers through the compressed memory directory in a manner that avoids the negative effects resulting from a compressible disk cache system.

Particularly, the present invention is directed to a storage server where the disk cache is compressed, and sectors can have headers and trailers, either attached by the hosts or by components of the storage server. The compressed disk cache comprises a compressed memory directory and a plurality of fixed-size blocks. The present invention teaches how to detach headers and trailers from sectors before storing the sectors in the disk cache, how to store the headers and trailers separately, and how to reattach headers and trailers to sector data when the sectors are sent from the disk cache to a host or to a mass storage device.

Particularly, the headers and trailers are managed through the compressed memory directory used to manage the compressed disk cache. Additional space is reserved in each entry of the compressed memory directory. This space is used to store the headers and trailers of the sectors corresponding to the entry. Alternatively, this space contains flags indicating the presence of headers and trailers, and pointers to memory devoted to contain headers and trailers. Particularly, an array of headers and trailers is contained in the compressed main memory of the storage server, and the pointers within the entries of the compressed disk cache point to entries of the array.

Alternatively, headers and trailers are stored within fixed-size blocks, and the additional space within the compressed memory directory entries contains the address of the blocks and the position of headers and trailers within the block.

Alternatively, the additional space is be reserved in an array separate from the compressed memory directory, but parallel to it, so that the same indexing scheme is used to address both parallel array and compressed memory directory.

Advantageously, the process of detaching headers and trailers from sectors for separate storage results in increased efficacy of data compression, thus yielding better compression ratios, and decreased memory traffic generated by host reads, host writes, cache stages and cache destages.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
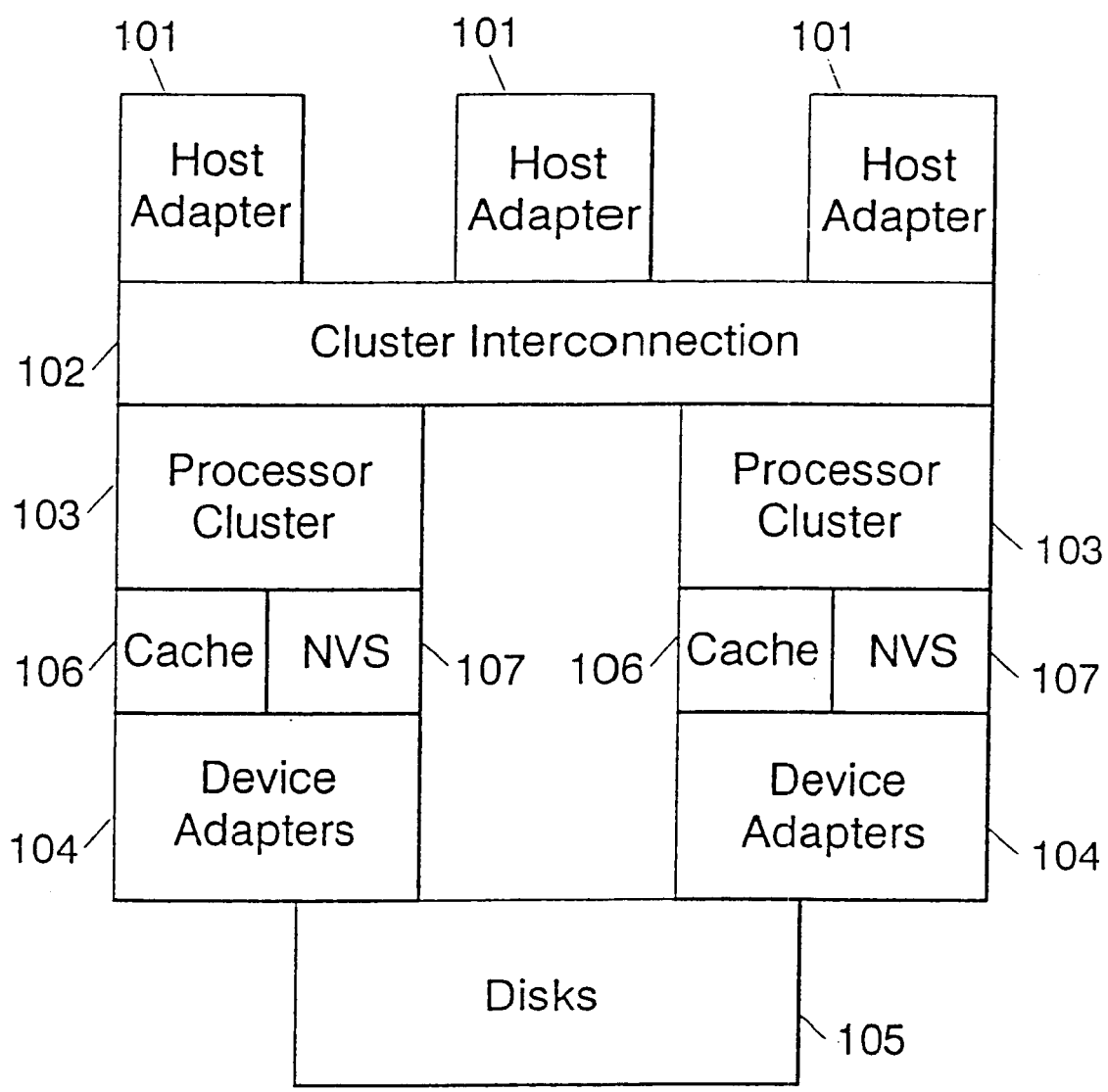
FIG. 1 is a block diagram depicting the typical structure of a storage server device.
Figure 2:
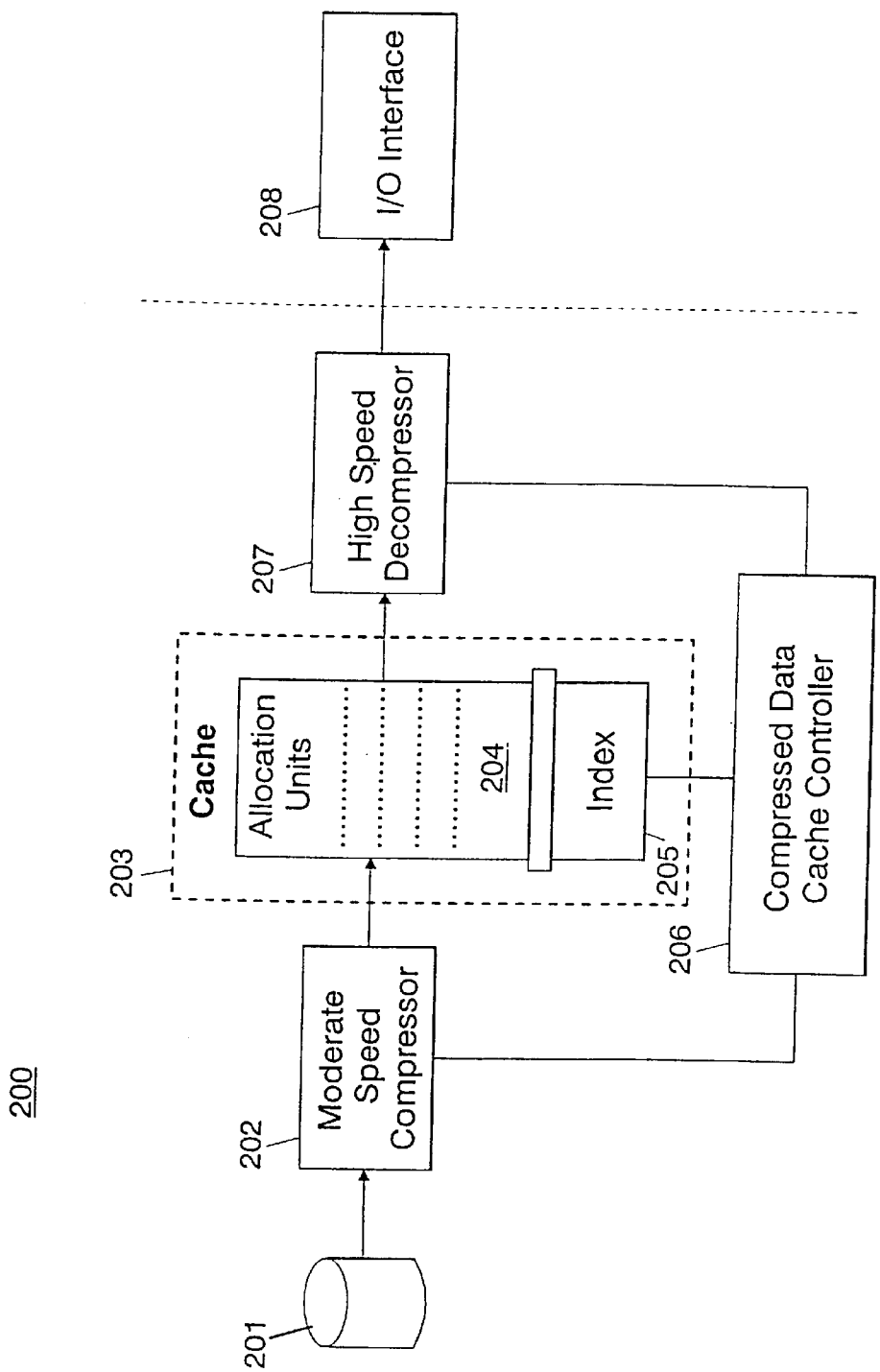
FIG. 2 illustrates an example of a system architecture for a compressed cache 200.
Figure 3:
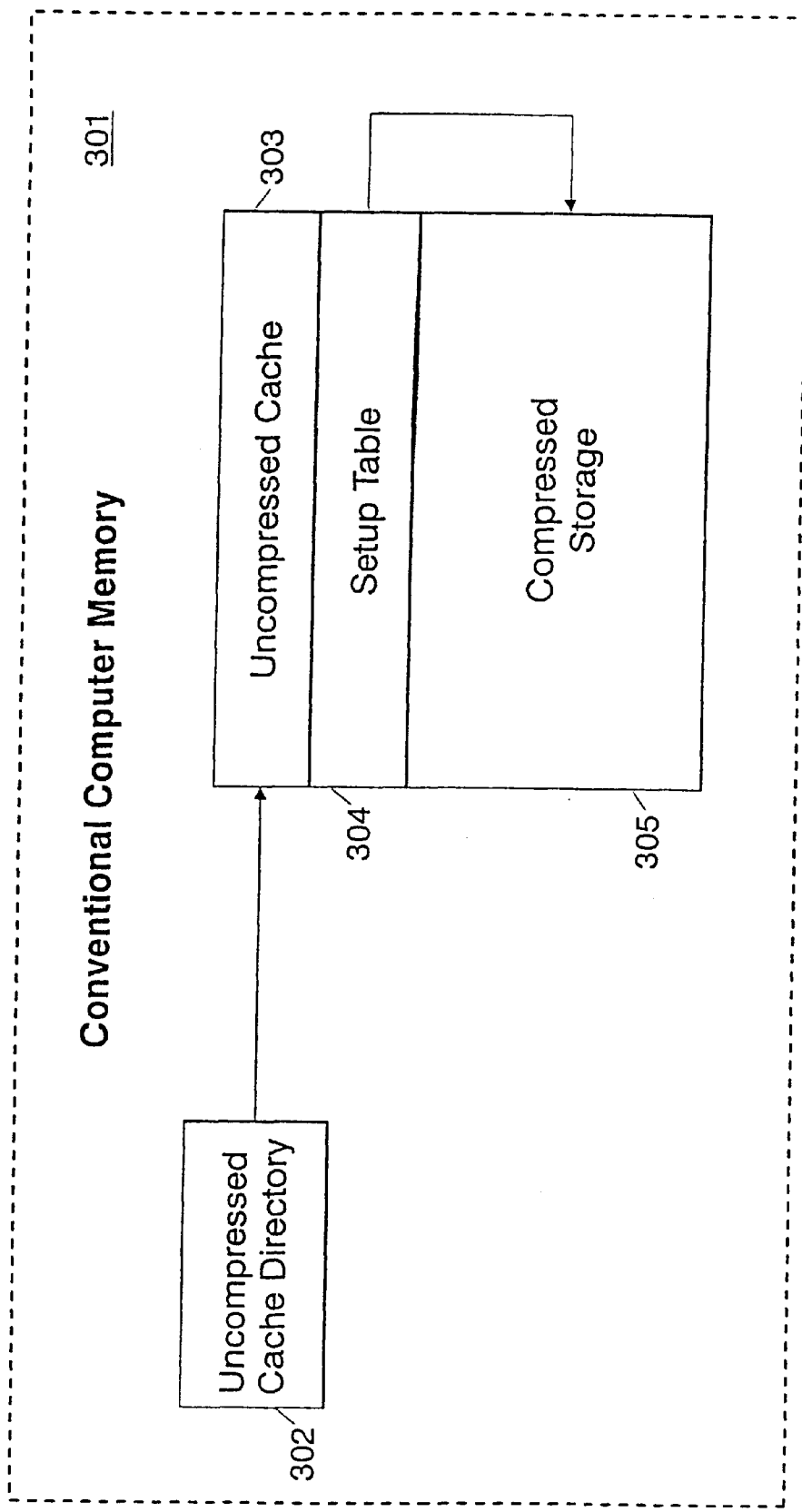
FIG. 3 illustrates an example of a computer memory architecture where part of the main memory is compressed and part is used as an uncompressed memory cache.
Figure 4:
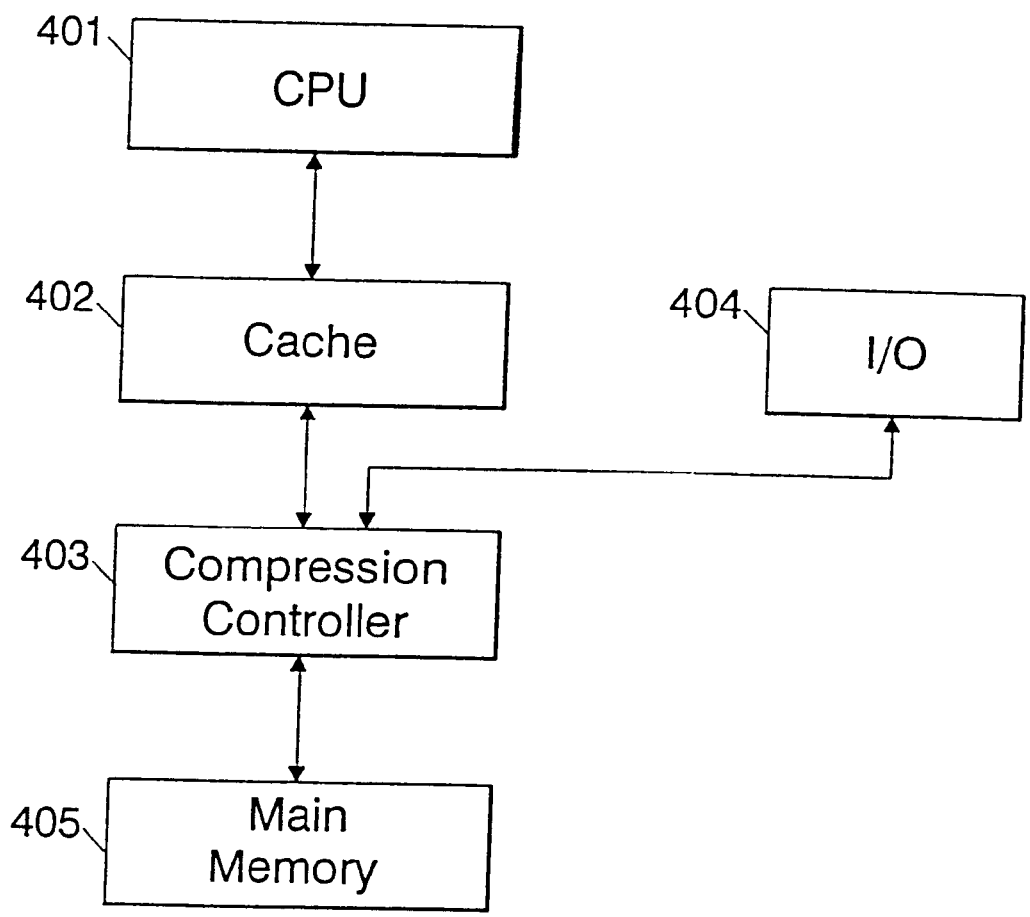
FIG. 4 illustrates an example computer architecture having a compressed main memory whereby data is decompressed when it travels from memory to processor cache or to I/O, and compressed when it travels from the processor cache or the I/O to the main memory.

One method for efficiently implementing a disk cache on a computer supporting main memory compression according to the invention is now described. Referring back to FIG. 1, it is assumed that some of the host systems attach a header or a trailer to each 512-bytes sector data, and that the host adapters (101) or the processor clusters (103) attach headers or trailers to all sector data coming from hosts that do not attach headers or trailers, in order to have a uniform sector format throughout the storage server. Those skilled in the art will appreciate that the following description is also relevant to storage servers that add headers or trailers containing information to improve data integrity, such as CRC bits.

Figure 7:
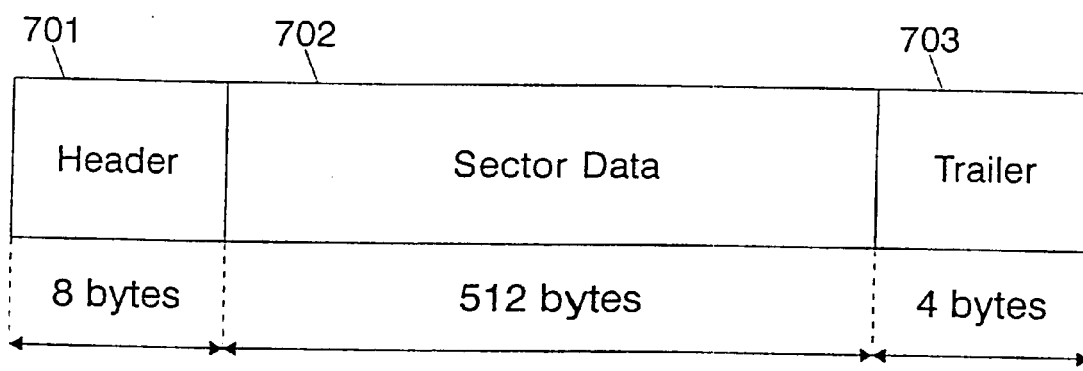
FIG. 7 depicts an example sector having header, sector data and trailer.

Referring now to FIG. 7, it is assumed that each sector has a header 701 of, for example, eight (8) bytes long, a sector data 702 of, for example, 512 bytes long, and a trailer (703) of, for example four (4) bytes long. Those skilled in the art will appreciate that the embodiments of the present invention may be easily adapted to the cases where only the header or only the trailer is present. In the description of the embodiments, it is assumed that the size of a memory line is 1024 bytes, and that the size of a page is 4096 bytes. It would be clear to those skilled in the art how to appropriately adapt the description of the embodiment to appropriately suit different sector sizes, different memory line sizes and different page sizes.

The main operations related to input/output performed by the processor cluster 103 (of FIG. 1) are: servicing host reads, servicing host writes, staging data from mass storage to cache, and, destaging data from cache to mass storage.

Figure 8:
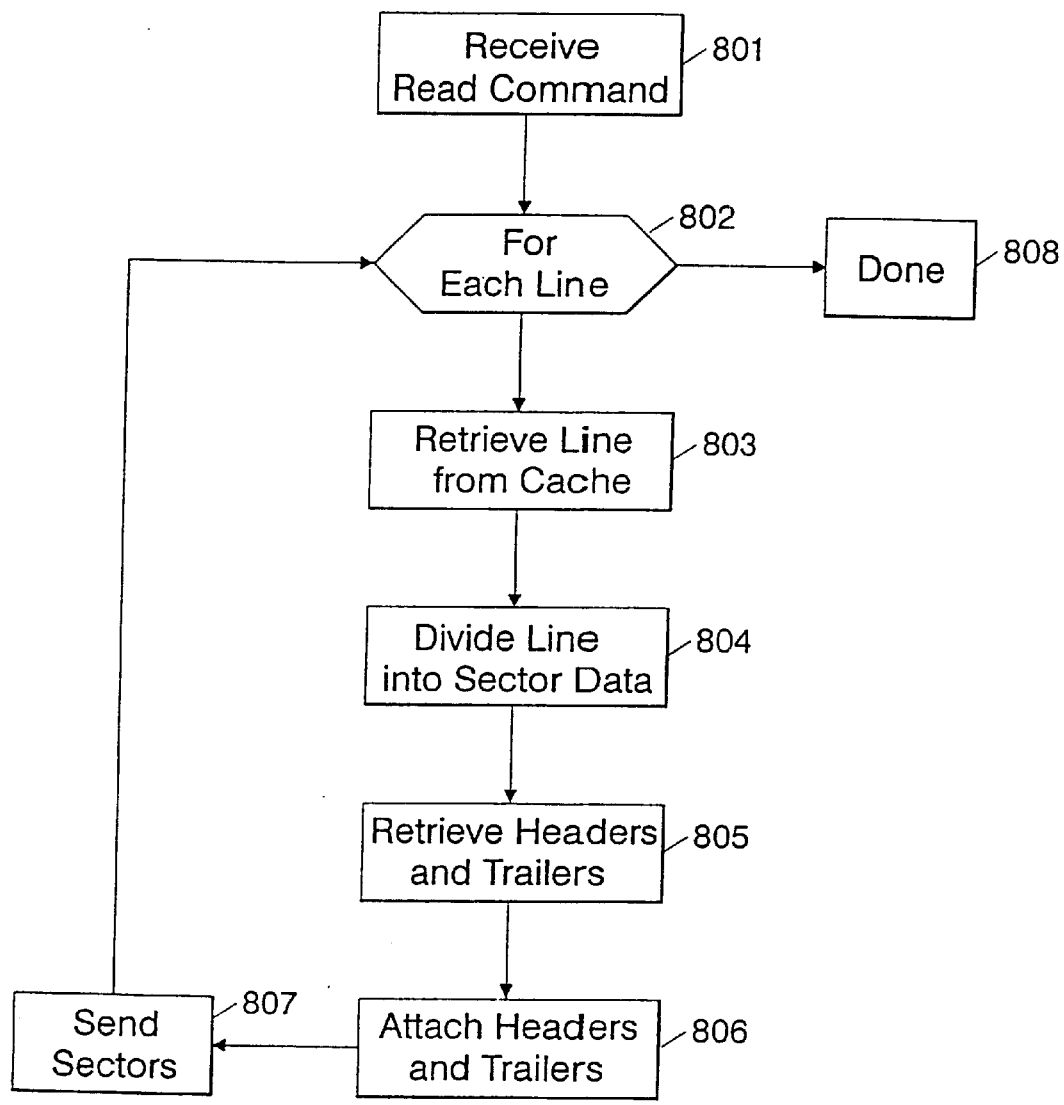
FIG. 8 is an example logic flow diagram depicting the method for servicing a host read request in accordance with the principles of the present invention.

FIG. 8 is an example logic flow diagram depicting the method for servicing a host read request in accordance with the principles of the present invention. FIG. 8 particularly depicts how the processor cluster services a host read, according to an embodiment of the invention. In FIG. 8, it is assumed that the data requested by the host is in cache. If the data is not in cache, it is first staged to cache, as will be explained in greater detail herein with respect to FIG. 10 and then the request is serviced as depicted in FIG. 8. Specifically, at step 801, the host request to read sectors from the server is received, and the server determines if the required sectors are in cache. If the sectors are not in cache, they are staged to cache from the disk, and the address of the sectors in cache are determined using the cache directory. When step 801 terminates, the server knows the address of all the sectors requested from the server. One or more sectors, requested from the server, will be stored in one or more memory lines within the cache. Then, at step 802, the process iterates over all the memory lines containing sectors requested by the host. Thus, as indicated at step 803, each line is received from the cache based on its address, as determined in step 801. At step 804, the memory line is divided into sector data. Those skilled in the art will appreciate that, if the size of a memory line is equal to the size of a sector data, step 804 will not be executed, and that, if the size of a memory line is smaller than the size of a sector data, step 804 will combine memory lines into sector data. At step 805, the server retrieves the headers and trailers for each of the sector data produced by step 804. The details of step 805 depend on how the header and trailers are actually stored and managed, and different embodiments of the present invention will be detailed herein with respect to FIGS. 12 to 17. Finally, at step 806, the server attaches the headers and trailers retrieved at step 805 to the corresponding sectors produced by step 804. Then, at step 807, the processor sends the sectors (comprising header, sector data, and trailer) to the host. When the last requested sector has been sent to the host, as determined at iteration step 802, the process terminates and the server terminates the reads in step 808.

Figure 9:
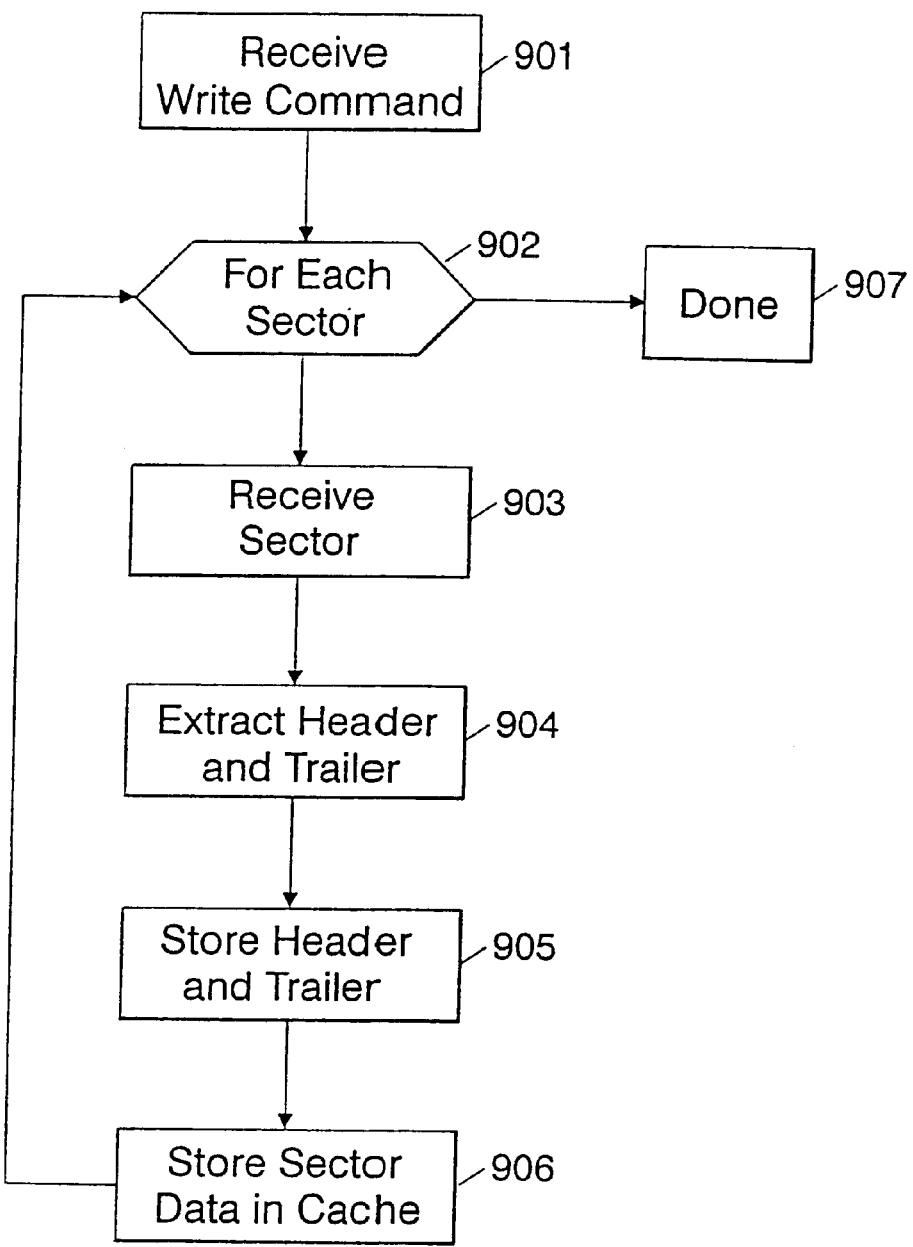
FIG. 9 is an example logic flow diagram depicting the method for servicing a host write request in accordance with the principles of the present invention.

FIG. 9 is an example logic flow diagram depicting the method for servicing a host write request in accordance with the principles of the present invention. In FIG. 9, at step 901, the host request to write sectors to the server is received, the appropriate communication protocol is initiated, and the server allocates space in the cache for the sectors written by the host, and the host sends the sectors. Then, at step 902, the process iterates over all sectors sent by the host. At step 903, the server receives a sector from the host, in the format depicted in FIG. 7. At step 904, the server separates header and trailer from the sector data, and, at step 905 stores the header and trailer data. The details regarding step 905 depend on the particular embodiment of the invention as will be described herein with respect to FIGS. 12 to 17. Finally, at step 906, the sector data is stored in the data cache. When the last sector sent by the host has been stored, the iteration step 902 terminates at step 907 and the storage server resumes its normal operation.

Figure 10:
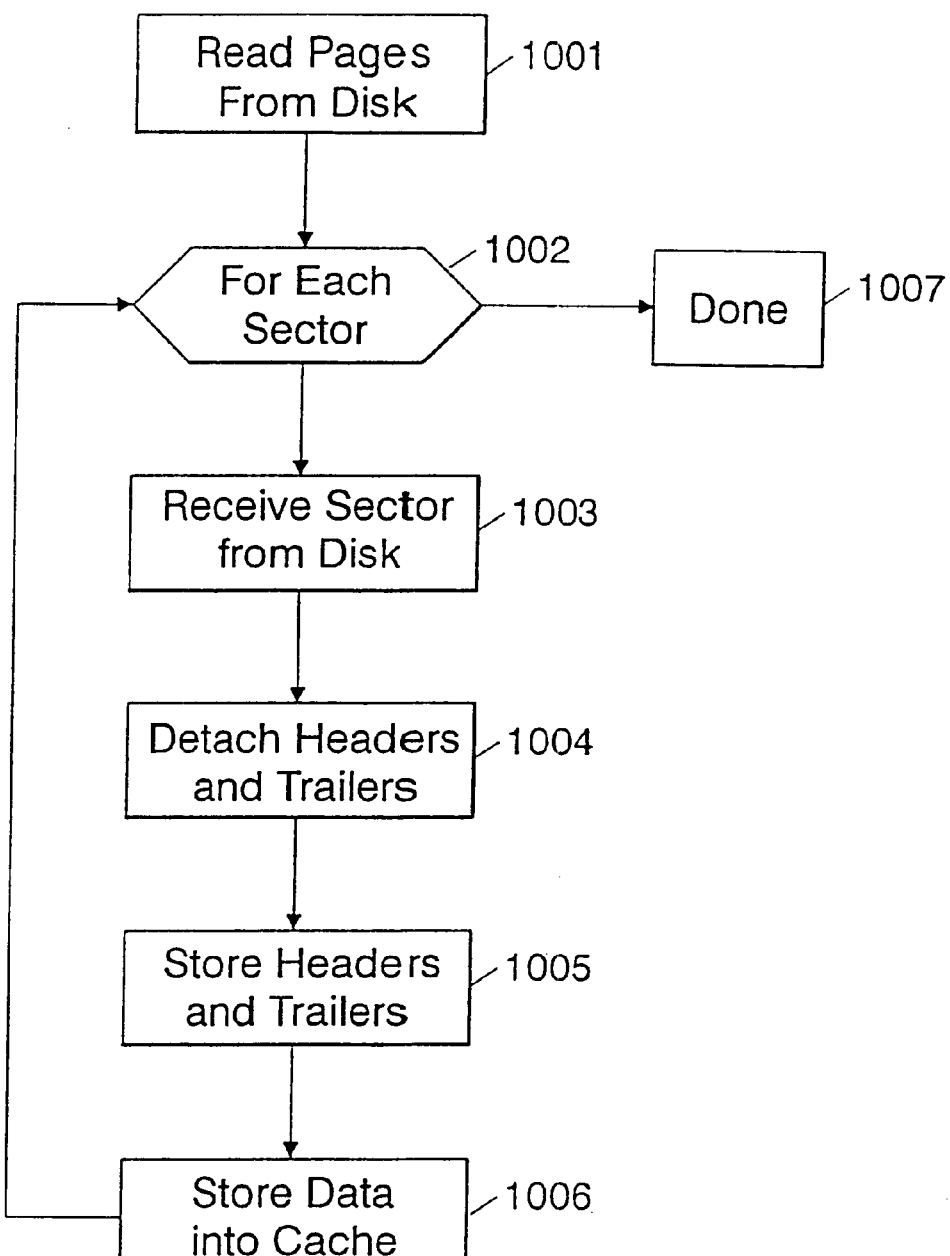
FIG. 10 is an example logic flow diagram depicting the method for staging data to the disk cache in accordance with the principles of the present invention.

FIG. 10 is an example logic flow diagram depicting the method for staging data to the disk cache in accordance with the principles of the present invention. Specifically, FIG. 10 depicts how the processor cluster stages data to cache, that is, how data is read from mass storage (the combination of 104 and 105 in FIG. 1) into the disk cache. In FIG. 10, at step 1001, the storage server sends a read request to the mass storage subsystem, which responds by sending the requested data. In general, the request is for one or more pages, each composed of several sectors. Typically, each page includes 8 sectors however this amount may vary. Additionally, in step 1001, the storage server finds space in the disk cache where to store the data coming from disk, and manages the cache directory appropriately. Step 1002 in FIG. 10 begins an iteration comprising steps 1003–1006 over all the sectors received from the mass storage subsystem. Step 1003 indicates the receipt of an individual sector from the mass storage subsystem having the format as depicted in FIG. 7. In FIG. 10 at step 1004, the header and trailer are separated from the sector data and are stored into the disk cache at step 1005. According to the invention, several mechanisms exist for storing and managing the header and trailers as will be described in further detail with respect to FIGS. 12 to 17. Next, at step 1006, the sector data is stored into the disk cache. When the last sector is received from the mass storage subsystem and stored in the cache, the iteration 1002 terminates and the destaging completes as indicated at step 1007.

Figure 11:
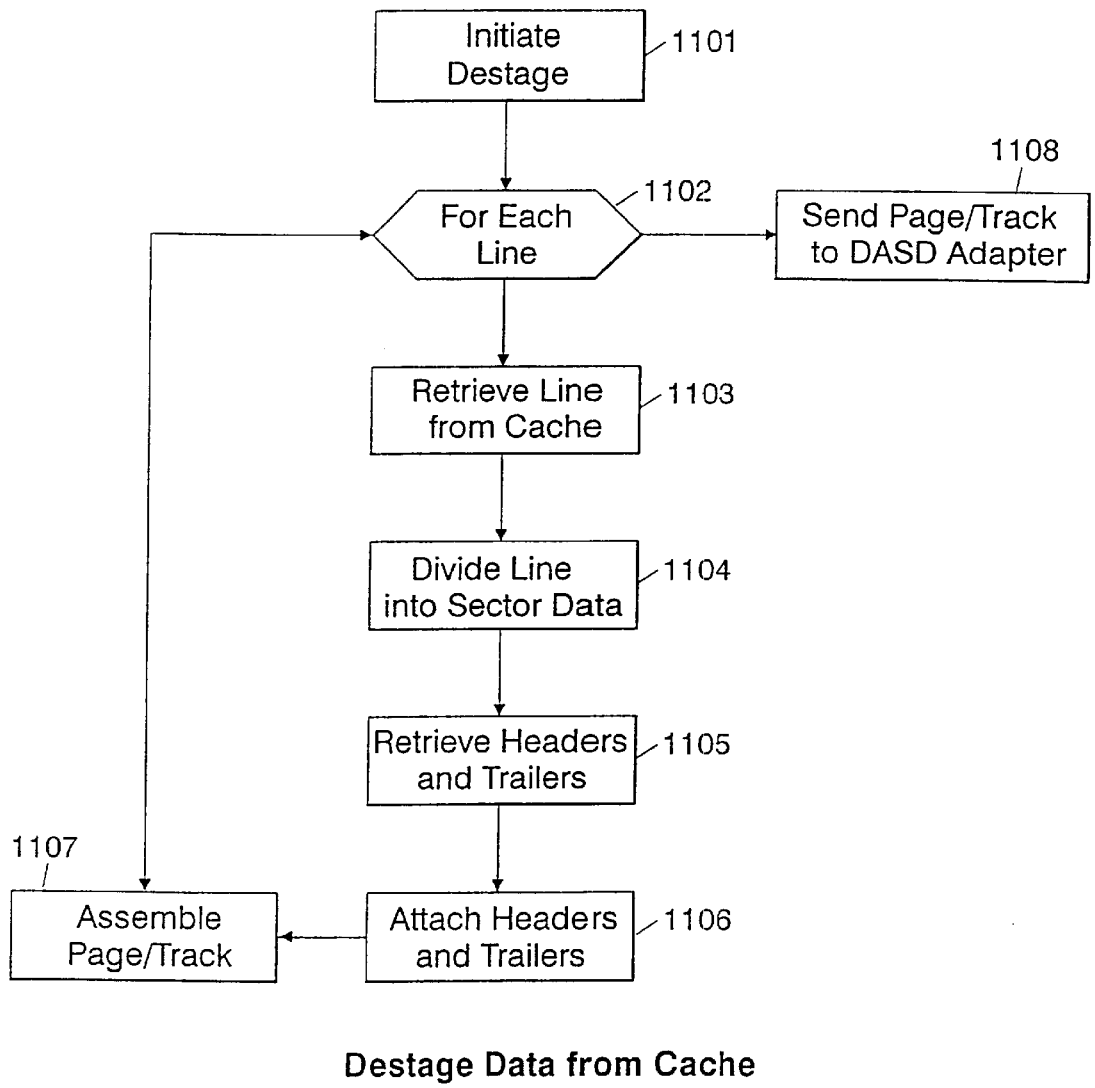
FIG. 11 is an example logic flow diagram depicting the method for destaging data to disk in accordance with the principles of the present invention.

FIG. 11 is an example logic flow diagram depicting the method for destaging data to disk in accordance with the principles of the present invention. Specifically, FIG. 11 depicts how the processor cluster destages data from cache, that is, how data stored in cache is written to the mass storage subsystem. As shown in FIG. 11, at step 1101, the destage is initiated. Step 1102 in FIG. 11 begins an iteration comprising steps 1103–1106 over all memory lines to be destaged to disk. Particularly, step 1103 indicates the retrieval of an individual memory line from the memory. At step 1104, that memory line is divided into the sector data of one or more sectors (if the memory line is 1024 bytes long, and a disk sector contains 512 bytes of data, each memory line is divided into the sector data of two sectors). At step 1105 the header and trailer of each sector are retrieved and at step 1106, the data portion of each sector is combined with the corresponding header and trailer. Finally, at step 1007, the sectors are assembled into the unit of destage (for example, a track for storage on the disk). Those skilled in the art will appreciate that the unit of destage may have different sizes. When all the memory lines have been processed, the iteration 1102 terminates, and the data is sent to the disk subsystem as indicated at step 1008.

Figure 12:
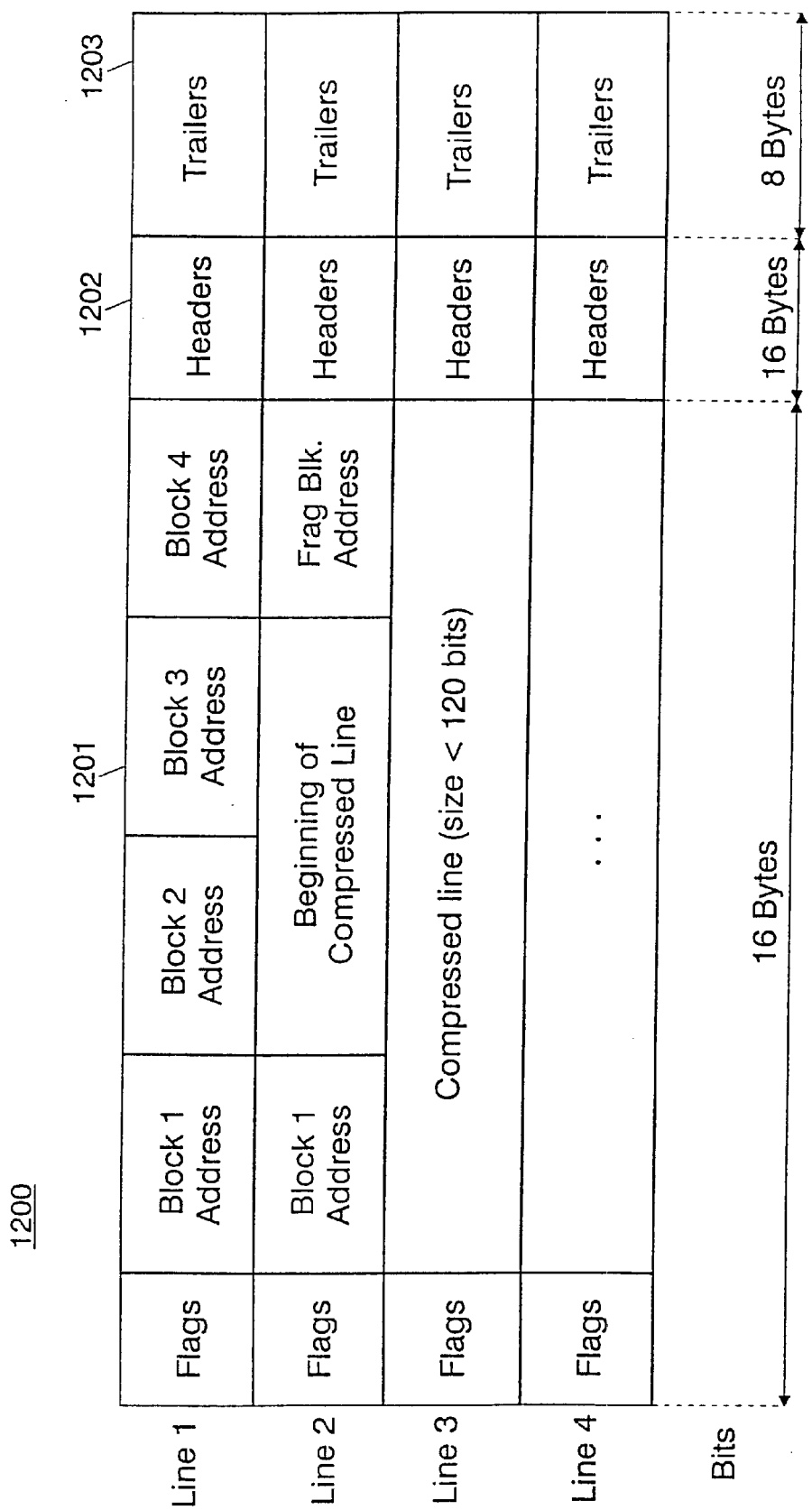
FIG. 12 illustrates an example compressed memory directory structure wherein each entry includes a space for storing the headers and trailers of the sectors stored in the corresponding memory line.

In a first embodiment of the invention, the header and trailer are stored within the directory used to manage the compressed memory. FIG. 12 is a modified version of the compressed memory directory structure according to FIG. 6, wherein each entry has been modified to include space for storing the headers and trailers of the sectors stored in the corresponding memory line. As shown in FIG. 12, the example modified compressed memory directory 1200 includes compressed memory directory entries for 4 lines of data. The compressed memory directory portion 1201 is identical to the portion of the compressed memory directory shown in FIG. 6. In the first embodiment, each entry of the directory (corresponding to a different line) additionally includes a space 1202 for the headers and a space 1203 for the trailers of the sectors composing the memory line. If the size of the memory line is 1024 Bytes, and sectors have the format depicted in FIG. 7, then each memory line includes the sector data of two (2) sectors, and the corresponding entry in the memory compression directory contains 16 additional bytes for headers and 8 additional bytes for trailers. Those skilled in the art will appreciate that the space for headers and trailers need not be at the end of the directory entry, but, in the spirit of the first embodiment, may reside anywhere within the entry.

Figure 13:
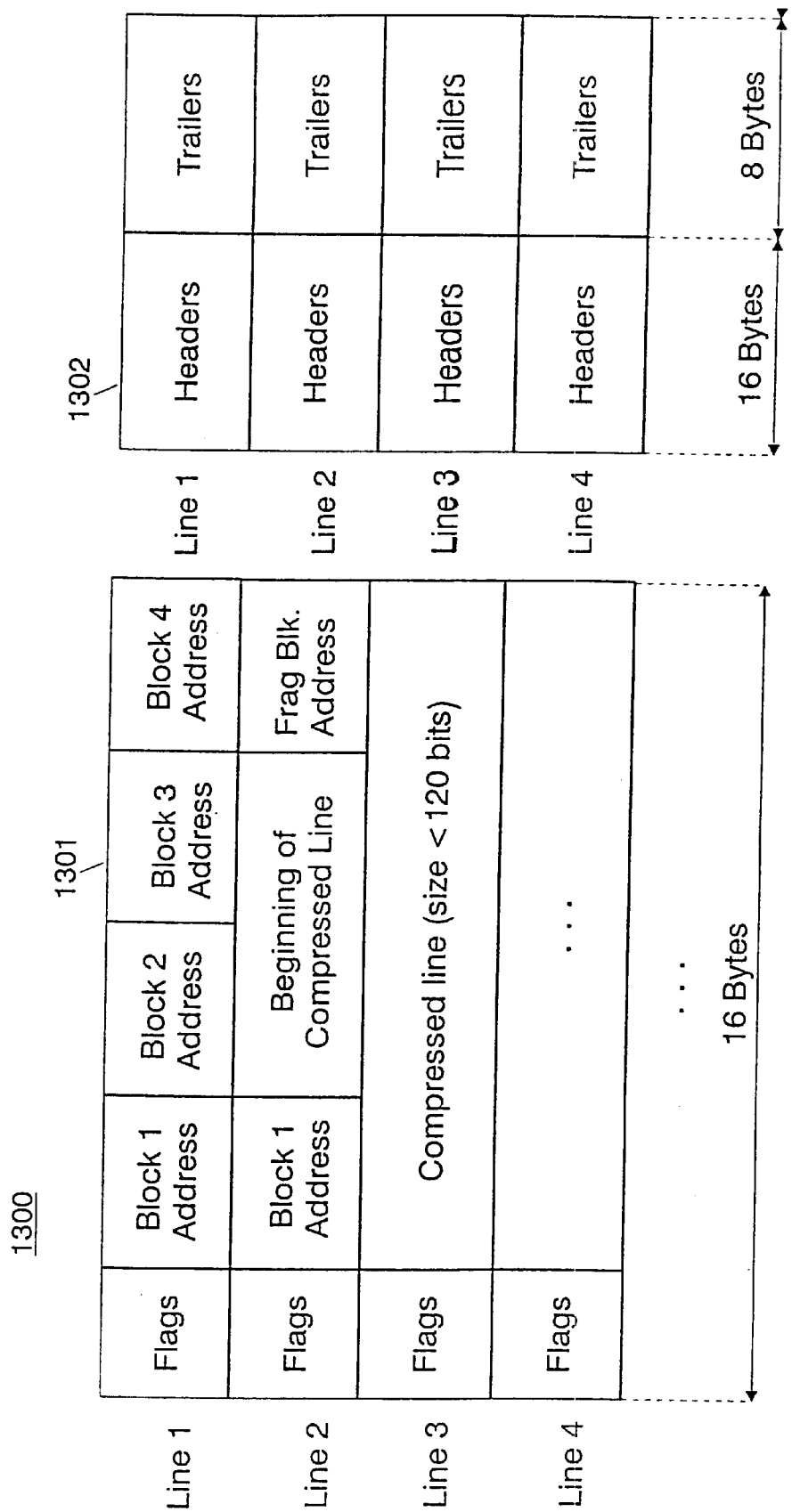
FIG. 13 illustrates an alternative compressed memory directory structure, wherein the headers and trailers are stored in a parallel array to the compressed memory directory.

In a second embodiment, depicted in FIG. 13, the space for storing headers and trailers information may be allocated in a separate memory array. In FIG. 13, there is illustrated a modified compressed memory directory 1300 having a compressed memory directory portion 1301 which is identical to the one shown in FIG. 6. However, there is further provisioned a parallel array 1302 maintained for storing both the header and trailer information. It is understood that the parallel array 1302 having the header and trailer are organized as lines corresponding to the memory lines in the modified compressed memory directory portion 1301 and may be indexed with the same mechanism used to index the compressed memory directory. Those skilled in the art will appreciate that the array 1302 for the headers and trailers may additionally be split into a plurality of arrays (including, for instance, the headers only and the trailers only, or pairs of header-trailers for the individual blocks) in the spirit of the invention.

Figure 6:
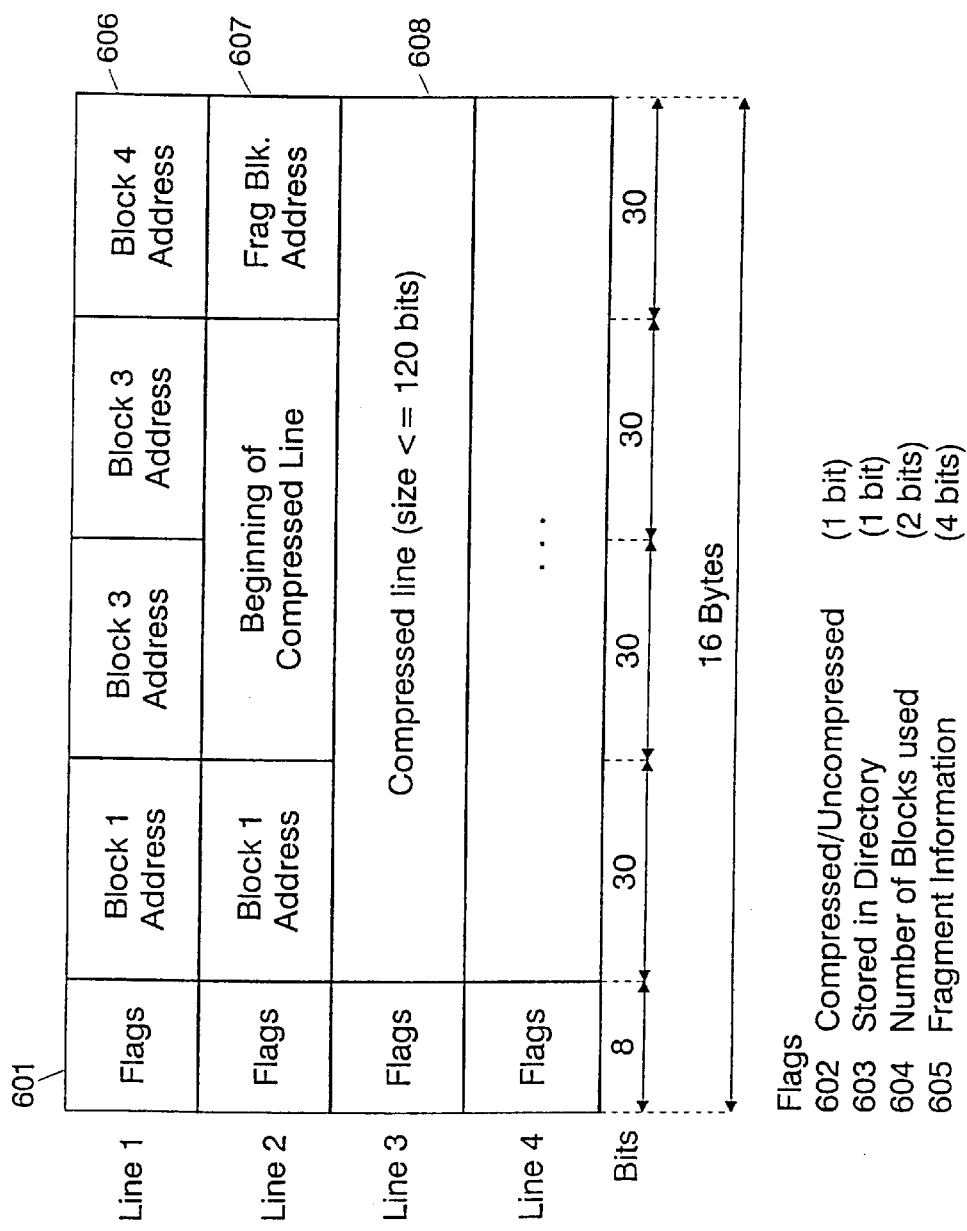
FIG. 6 illustrates an example of the structure of the compressed memory directory used in FIG. 5.
Figure 14:
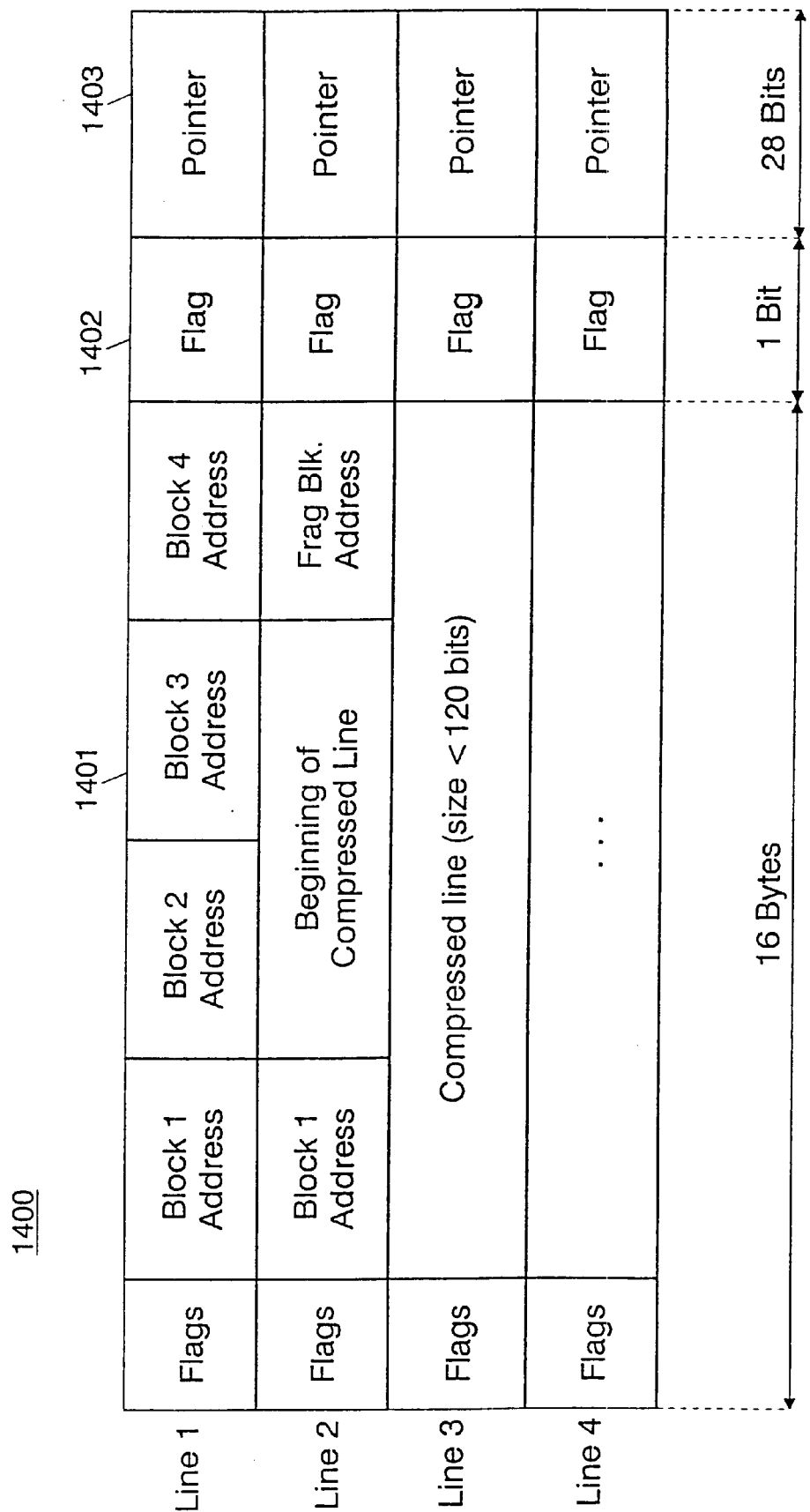
FIG. 14 illustrates an example compressed memory directory structure, wherein each entry includes a flag bit for denoting whether headers and trailers are present, and a pointer to an array containing headers and trailers.
Figure 15:
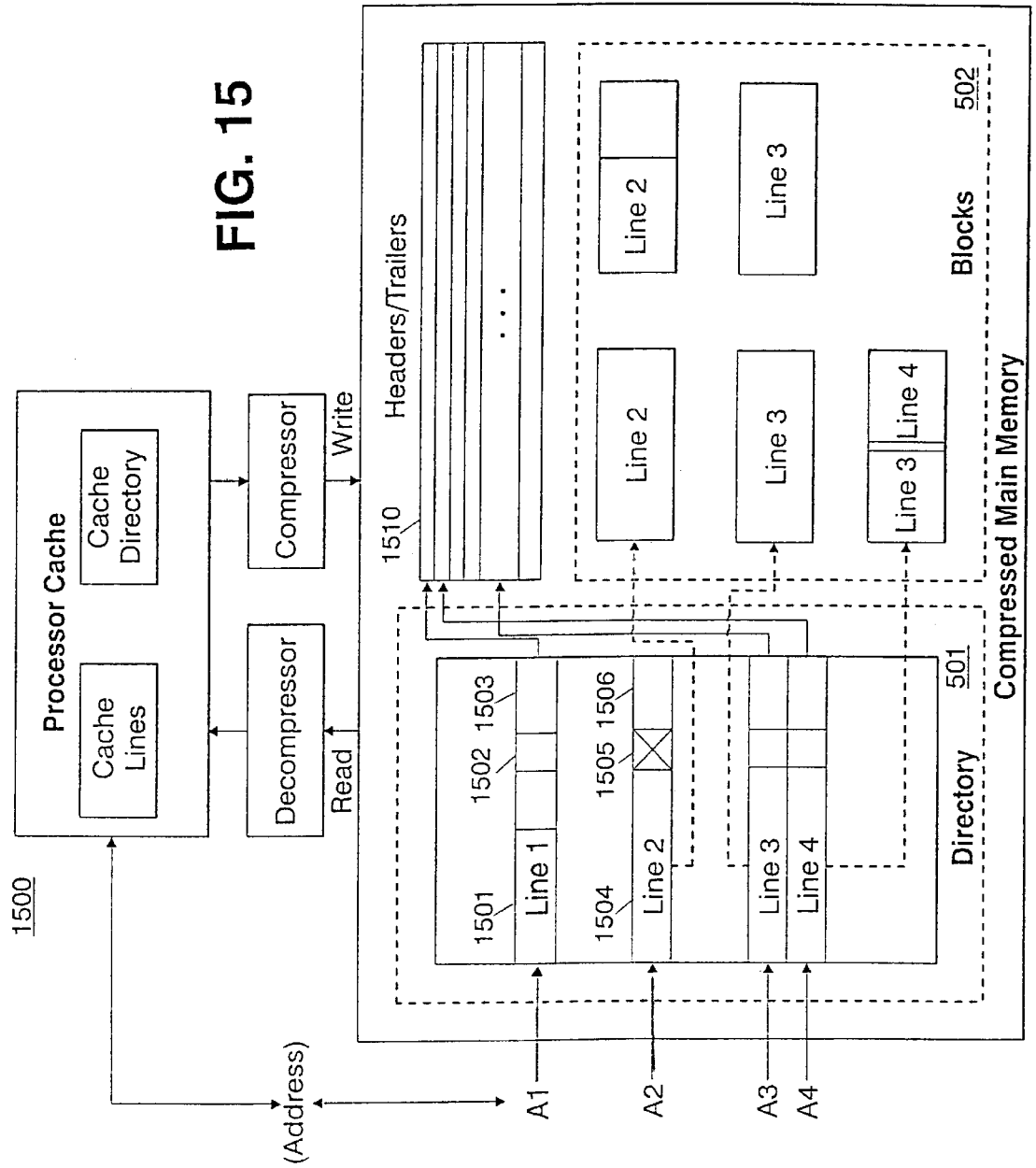
FIG. 15 illustrates an example memory organization in accordance with the principles of the invention.

In a third embodiment of the invention, where the disk cache may include both sectors with header and trailer information and sectors without header and trailer information, the memory compression directory is modified to include a flag indicating whether or not the sectors composing each line have a header and trailer, and further, to include a pointer to an array of headers and trailers. This embodiment is illustrated in FIGS. 14 and 15. FIG. 14 particularly depicts an example compressed memory directory structure 1400 having a portion 1401 identical to the structure of the compressed memory directory shown in FIG. 6, with an entry corresponding to each line including a flag 1402 indicating if the sectors have header and trailer, and a pointer 1403. The size of the pointer corresponding to the size of the block addresses shown in FIG. 6 is 28 bits, for example. If the disk cache contains sectors with a header and trailer, sectors with just a header, sectors with just a trailer and sectors without header and trailer, then the memory compression directory may include two flags 1402 rather than a single flag, to indicate separately whether the header is present and whether the trailer is present. If individual memory lines may contain sectors of different types (some with headers or trailers, others without), then each memory directory entry will contain the appropriate number of flags for each of the sectors composing the line. Those skilled in the art will appreciate that an organization analogous to that depicted in FIG. 13 wherein a separate memory array portion is employed, may also be adopted for the current embodiment.

Figure 5:
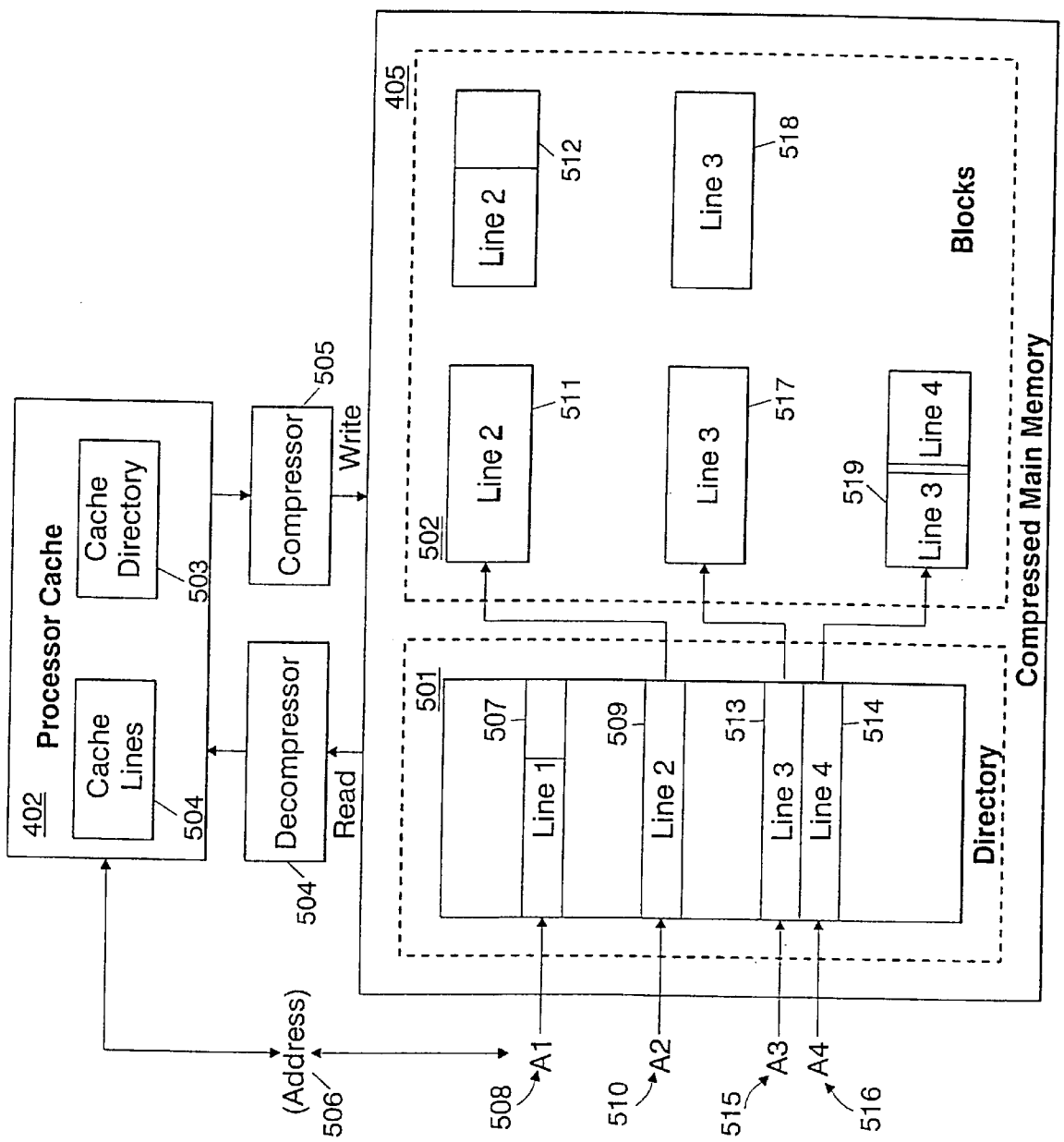
FIG. 5 illustrates an example processor cache and main memory organization for the computer architecture of FIG. 4, where the compressed main memory contains a compressed memory directory and a plurality of fixed-size blocks.

FIG. 15 shows the compressed main memory organization 1500 in accordance with the principles of the invention. The organization is similar to that depicted in the prior art of FIG. 5. The difference is in the compressed memory, which contains in addition to a directory 501 and of fixed-size memory blocks 502, an array 1510 comprising the header and trailer. For example, the directory entry 1501 for line 1 associated with address A1 is, for example, for a memory line whose sectors do contain headers and trailers. In this first example instance, the flag bit 1502 is set to indicate an instance of sectors that do contain headers and trailers. Correspondingly, the pointer 1503 includes the index of the entry of the array 1510 containing the headers and trailers for the sector data stored in the memory line. The directory entry 1504 for line 2 associated with address A2, on the other hand, is for a memory line whose sectors do not contain headers and trailers. In this second example instance, the flag bit 1505 is not set, and therefore the pointer 1506 is not used. Referring to FIGS. 14 and 15, in another embodiment, the array 1510 is allocated in the part of the main memory that is actually compressed. Therefore, the pointers 1503 are not used to index the array directly, but to index a further entry of the directory 501. In this case, the array 1510 is compressed in the same fashion as the rest of the compressed data.

Figure 16:
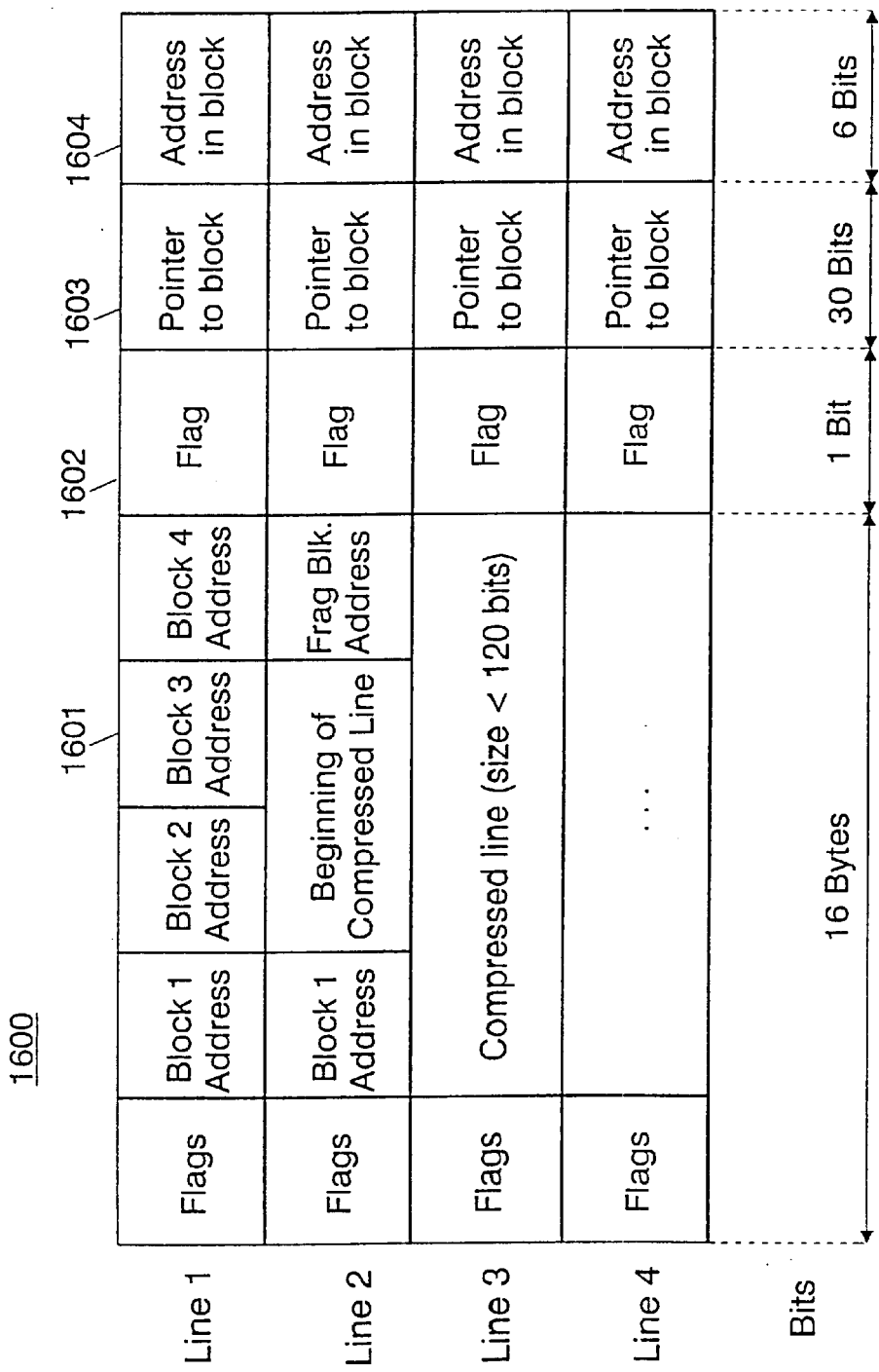
FIG. 16 illustrates an example compressed memory directory structure, wherein each entry of the compressed memory directory contains a bit flag, a pointer to a fixed-memory block, and the offset of the header and trailer within the fixed-size memory block.
Figure 17:
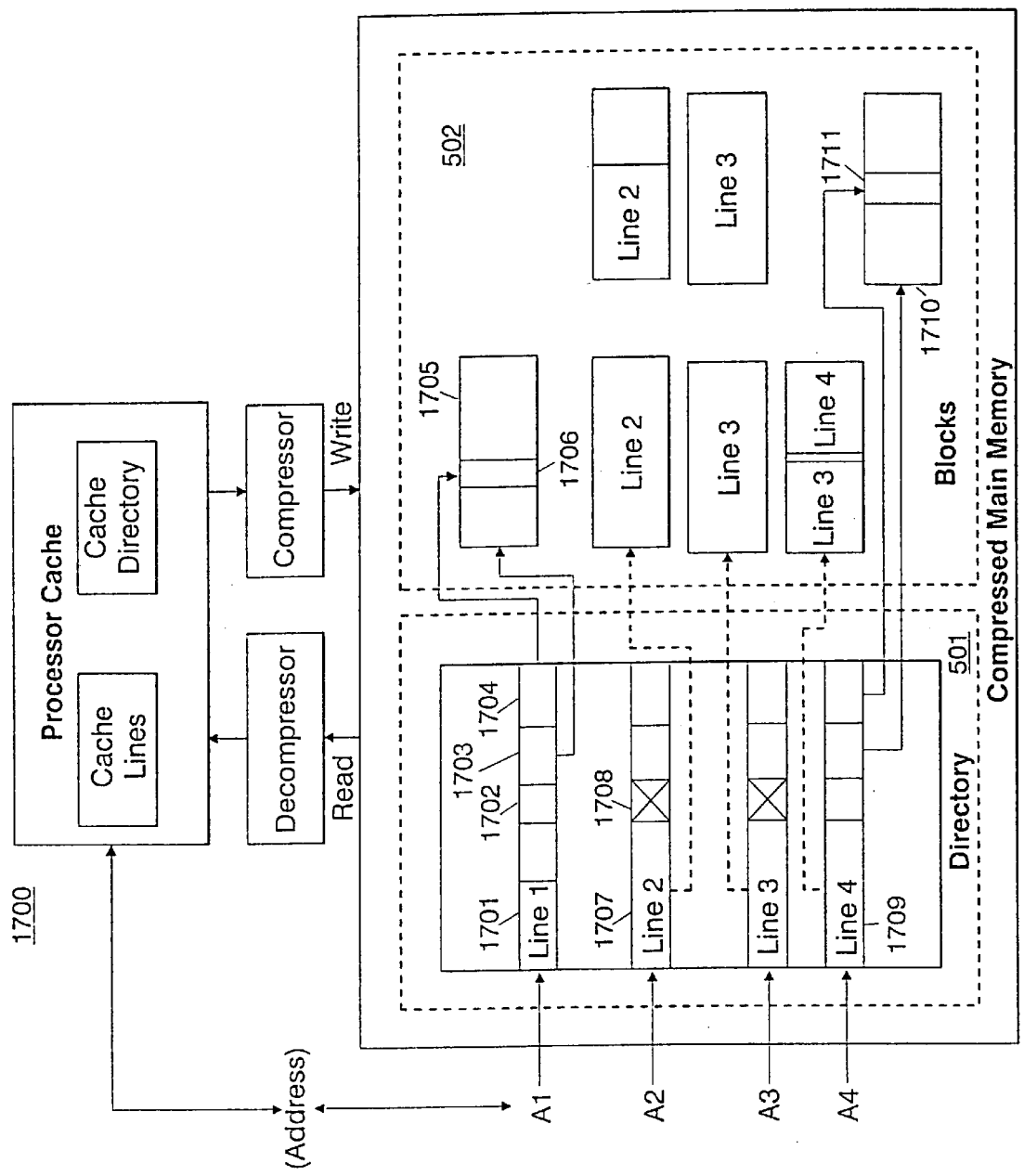
FIG. 17 illustrates an example memory organization where the compressed memory directory has the structure shown in FIG. 16.

The size of the array 1510 is difficult to change dynamically. FIG. 16 and 17 illustrate another embodiment of the invention where the memory array comprises a chain of fixed size memory blocks 502. FIG. 16 illustrates an example compressed memory directory structure, wherein each entry of the compressed memory directory contains a bit flag, a pointer to a fixed-memory block, and the offset of the header and trailer within the fixed-size memory block. FIG. 16 particularly illustrates the organization of the compressed memory directory structure 1600, where 1601 is identical to the structure of the compressed memory directory shown in FIG. 6. The entries corresponding to memory lines include flags 1602 as previously described with reference to FIG. 14, and a pointer 1603 to a memory block, where header and trailer are stored. Each memory block may include headers and trailers corresponding to different lines. Hence, in a first embodiment, the compressed memory directory entries also comprise a field 1604 including the offset of the headers and trailers within the memory block. In another embodiment, the field 1604 is not used, and 1603 is the index in an array of pairs, where the first element of a pair is a pointer to a block and the second element is the address within a block. In a further embodiment, the array of pairs may be replaced by two arrays, one containing pointers to blocks, and the other containing addresses within blocks. In yet another embodiment, the field 1604 includes the address within a block, while the field 1603 includes the index in an array containing pointers to blocks. All the embodiments described with reference to FIG. 16 provide addressing methods to memory blocks.

FIG. 17 illustrates an example compressed memory organization 1700 corresponding to the first embodiment described in reference to FIG. 16, that may be readily adapted and configured by one skilled in the art to form the other embodiments. The organization 1700 is identical to that of FIG. 5, where the compressed main memory includes a directory 501 and fixed-size memory blocks 502. In FIG. 17, some of the blocks store compressed data, while other blocks include headers and trailers 1705, 1710. The directory 501 is organized as described in FIG. 16. Those skilled in the art will appreciate that an organization analogous to that depicted in FIG. 16 may also be adopted for the current embodiment. The directory entry 1701 for line 1 associated with address A1 is, for example, for a memory line whose sectors contain headers and trailers, as denoted by the flag 1702, and therefore the pointer 1703 includes the index of block 1705 within the fixed-size memory blocks 502 where the headers and trailers are stored. The offset field 1704 includes the offset within block 1705 where the headers and trailers 1706 corresponding to directory entry 1701, are stored. The directory entry 1707 for line 2 associated with address A2, on the other hand, is for a memory line whose sectors do not contain headers and trailers, as denoted by the flag 1708, and therefore the pointer and offset are not used. The directory entry 1709 for line 4 associated with address A4, is also for a memory line whose sectors contain headers and trailers 1711 and are stored in block 1710.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. In a computer memory system capable of storing data in compressed and uncompressed form, and in which units of data held in said system comprise sectors with each sector comprising header, sector data, and trailer portions for storage in a compressed main memory, a method for storing said sectors including the steps of:

a) separating header and trailer portions from each sector data portion of each sector during a data storage operation, and storing said sector data and associated header and trailer portions in fixed size data blocks provided in said compressed main memory, b) providing a memory directory structure in said compressed main memory having entries for enabling access to said fixed size data blocks in said compressed main memory in accordance with issued real addresses; and, c) indexing a memory directory structure entry for performing a system read and write operation of a data sector and its associated header and trailer portion stored in said compressed main memory in accordance with a corresponding issued real address, wherein compressed memory storage efficiencies are achieved by separating said header and trailer sector portions for independent processing thereof.

2. The method for processing sectors as claimed in claim 1, wherein said header and trailer portions are stored uncompressed, and said sector data is stored in compressed form.

3. The method for processing sectors as claimed in claim 1, wherein said memory storage system is organized as lines for separately storing separated one or more sector data portions; said method further including the step servicing a host read request by:

retrieving a line from said memory system;

dividing said line into sector data portions; and, for each sector data portion included in said line, retrieving separately stored header and trailer data and attaching said retrieved header and trailer portion associated with the sector data to build the corresponding sectors.

4. The method for processing sectors as claimed in claim 1, wherein said computer system further includes a mass memory storage system for storing data organized as pages comprising sectors of data, each sector including header, sector data and trailer portions, said method further including the step of staging data to said compressed memory storage system from said mass memory storage prior to servicing a read request from a host device.

5. The method for processing sectors as claimed in claim 4, wherein said staging data step includes:

reading a page of data from said mass memory storage system;

dividing said page into sectors; and, for each sector of said page, detaching associated header and trailer portions from said sector data for separate storage thereof, and storing said sector data in said compressed memory storage system.

6. The method for processing sectors as claimed in claim 1, wherein said computer system further includes a mass memory storage system for storing data organized as pages comprising sectors of data, each sector including header, sector data and trailer portions, said method further including the step of destaging data from said compressed memory storage system to said mass memory storage for servicing a write request from a host device.

7. The method for processing sectors as claimed in claim 6, wherein said destaging data step includes:

reading a line of data from said compressed memory storage system;

dividing said line into one or more sector data portions stored therein; and, for each sector data portion, retrieving said associated header and trailer portions from said compressed memory storage, and attaching said header and trailer portion to sector data for assembly as a page to be stored in said mass memory storage system.

8. The method for processing sectors as claimed in claim 1, wherein the compressed memory storage system comprises a main memory storage of a computer.

9. The method for processing sectors as claimed in claim 1, wherein the computer system includes a storage server device implementing a processor cluster, said compressed memory storage system comprises a compressed main memory storage device of said processor cluster.

10. The method for processing sectors as claimed in claim 4, wherein said mass memory storage system comprises a disk memory subsystem of a storage server.

11. The method for processing sectors as claimed in claim 4, wherein said mass memory storage system comprises a hierarchical storage system comprising one or more of: hard disks, optical disks, magneto-optical disks, magnetic tapes and other forms of mass storage media devices.

12. In a computer system including a main memory storage device comprising fixed-size data blocks for storing pages of memory each divisible as a plurality of memory lines comprising one or more sectors, each sector comprising a sector data portion having a possible association of header and trailer data, a memory storage system comprising:

a memory directory structure accessible by a processor and having entries for enabling read and write access to compressed data pages stored in said data blocks in accordance with issued real addresses, and, an array structure having entries in correspondence with entries of said directory structure and comprising associated header and trailer data, wherein a common index is used to access both an entry in said memory line and associated header and trailer data in a corresponding entry in said array structure.

13. The computer system as claimed in claim 12, wherein said array structure is separate from said memory directory structure and separate from data blocks in said main memory.

14. The computer system as claimed in claim 13, wherein said array structure comprises a first array structure comprising header data and a second array structure comprising trailer data.

15. The computer system as claimed in claim 12, further comprising a mechanism for servicing a write request by a host computer, said mechanism including:

device for receiving each sector to be written from said host for storage in said memory storage device;

device for extracting any associated header and trailer data from each said sector for storage in said main memory storage separate from said sector data.

16. The computer system as claimed in claim 15, said system further including a mass storage device and including a mechanism for destaging memory lines including sector data in said main memory device for storage as sectors in said mass storage device, said destaging mechanism comprising:

device for retrieving sector data belonging to each memory line from said main memory device;

device for retrieving associated header and trailer data for each retrieved sector data from said main memory device, and attaching said retrieved header and trailer data with each sector data for storage in said mass storage device.

17. The computer system as claimed in claim 16, further comprising a mechanism for servicing a read request for data by a host computer, said mechanism including:
   device for accessing a memory line from said memory storage device via said directory structure;
   device for dividing said memory line into sector data and implementing said directory structure for retrieving associated header and trailer data, said device further attaching said headers and trailers to said sector data to build said sector, and transferring said sector to said host.

18. The computer system as claimed in claim 17, further including staging mechanism for reading sectors from said mass storage device for storage as separate sector data and associated header and trailer in said main memory device, said staging mechanism comprising:
   device for retrieving sectors belonging to each memory line from said mass storage device;
   mechanism for detaching header and trailer data from said retrieved sectors; and,
   device for storing said sector data in said main memory device, and storing said associated header and trailer for each sector separately in said main memory device,
   wherein prior to servicing a host read request said mechanism stages said requested sectors to be read to said main memory storage.

19. The computer system as claimed in claim 12, wherein the main memory storage system comprises a compressed main memory storage system.

20. The computer system as claimed in claim 12, further including a storage server device implementing a processor cluster, said main memory storage system comprising a compressed main memory storage device of said processor cluster.

21. The computer system as claimed in claim 16, wherein said mass memory storage system comprises a disk memory subsystem of a storage server.

22. The computer system as claimed in claim 16, wherein said mass memory storage system comprises a hierarchical storage system comprising one or more of: hard disks, optical disks, magneto-optical disks, magnetic tapes and other forms of mass storage media devices.

23. A computer system including a main memory storage comprising fixed-size data blocks for storing pages of memory each divisible as a plurality of memory lines comprising one or more sectors, a sector comprising a sector data portion and having a possible association of header and trailer data, wherein said memory system comprises:
   a memory directory structure accessible by a processor and having entries for enabling read and write access to compressed data pages in said data blocks in accordance with issued real addresses, and,
   an array structure in said main memory comprising associated header and trailer data,
   wherein each entry of said directory structure includes a first field entry for indicating whether an addressed memory line comprises associated header and trailer data and, a second field entry for indexing into said array structure for accessing the header and trailer data associated with said sectors of an addressed memory line.

24. The computer system as claimed in claim 23, wherein said array structure comprises header and trailer data in uncompressed form and resides in said main memory storage, said second field entry including a pointer for directly indexing into said array structure.

25. The computer system as claimed in claim 23, wherein said array structure is allocated as part of said data blocks in said main memory storage, said second field entry comprising a further index into said directory structure for accessing header and trailer data in compressed form.

26. The computer system as claimed in claim 23, wherein said array structure is allocated as a chain of fixed-size data blocks each for storing header and trailer data, said second field entry comprising a pointer for pointing directly to a data block for accessing said header and trailer data.

27. The computer system as claimed in claim 26, wherein said data blocks comprises header and trailer data corresponding to different memory lines, a directory structure entry further comprising a third field entry comprising an offset for locating said header and trailer data within an indexed memory block.

28. The computer system as claimed in claim 26, wherein said data blocks comprise header and trailer data corresponding to sectors of different memory lines, said system further including an array structure having entries indexed by said pointer, each entry including a first element comprising a pointer for pointing to a memory block and a second element comprising an address within a block.

29. The computer system as claimed in claim 26, wherein said array structure comprises a first array sub-structure including pointers to blocks, and a second array sub-structure including addresses within said blocks for accessing header and trailer data corresponding to a sector in a memory line.

30. The computer system as claimed in claim 23, wherein said array structure is allocated as a chain of fixed-size data blocks each for storing header and trailer data, said system including an array sub-structure including pointers to said data blocks, wherein said second field entry comprises an index into said array sub-structure for accessing a pointer, a directory structure entry further comprising a third field entry comprising an address within a data block for accessing said header and trailer data for an accessed sector in a memory line.

31. The computer system as claimed in claim 23, further comprising a mechanism for servicing a write request by a host computer, said mechanism including:
   device for receiving each sector to be written from said host for storage in said main memory storage device;
   device for extracting any associated header and trailer data from each said sector for storage in said main memory storage separate from said sector data portion.

32. The computer system as claimed in claim 31, further comprising a mechanism for servicing a read request for data by a host computer, said mechanism including:
   device for accessing a memory line from said main memory storage device via said directory structure;
   device for dividing said memory line into sector data portions and implementing said directory structure for retrieving associated header and trailer data, said device further attaching said headers and trailers to respective sector data portions to thereby assemble said sectors for transfer to said host.

33. In a computer memory system capable of storing said data in both compressed and uncompressed form in a compressed main memory, and including fixed-size data blocks for storing pages of memory each divisible as a plurality of memory lines comprising sectors, each sector comprising a sector data portion and having a possible association of header and trailer data, a method for servicing data read and write requests initiated by a host system comprising:

for a write request, the steps of:
  a) receiving a sector of each memory line to be written from said host system to said compressed main memory;
  b) extracting said header and trailer data from said received sector;
  c) indexing a memory directory structure entry provided in said compressed main memory having entries for enabling access to locations in compressed main memory in accordance with issued real addresses for storing said header and trailer data at locations in said compressed main memory and storing said sector data portion in said compressed main memory separate from said header and trailer data;
  d) repeating steps a) through c) for each sector included in said memory line to be written.

34. The method for servicing data read and write requests as claimed in claim 33, wherein said computer system is a storage server.

35. The method for servicing data read and write requests as claimed in claim 34, where said header and trailer are added by a hosts computer system that send the data to said storage server for storage in a mass memory storage device.

36. The method for servicing data read and write requests as claimed in claim 33, wherein said computer system further includes a memory directory structure accessible by a processor and having entries for enabling read and write access to memory lines in said data blocks in accordance with issued virtual addresses, and, an array structure in said main memory comprising associated header and trailer data, said step of storing said header and trailer data in said main memory storage including the steps of:

setting a first field in said directory structure entry to indicate storage of associated header and trailer data for said stored sector in said main memory storage; and,
  setting a second field entry to indicate location of said stored header and trailer data in said array structure.

37. The method for servicing data read and write requests as claimed in claim 36, wherein said array structure is allocated as a chain of fixed-size data blocks each for storing header and trailer data in compressed form, said method including the step of setting said second field entry to indicate location of said stored header and trailer data in said data block.

38. The method for servicing data read and write requests as claimed in claim 33, further including the step of destaging memory lines comprising stored sector data portions in said main memory device into sectors for storage in a mass memory storage device, said destaging step comprising the steps of:

e) retrieving a data sector belonging to a memory line to be destaged from said main memory device;
  f) retrieving any associated header and trailer data for each retrieved sector data portion from said main memory device;
  g) attaching said retrieved header and trailer data with each sector data portion;
  h) assembling said sector for storage in said mass memory storage device; and
  i) repeating steps e)-h) for each memory line to be destaged.

39. The method for servicing data read and write requests as claimed in claim 36, wherein for a read request of memory lines, the steps of:

j) accessing a memory line from said main memory storage device via said directory structure;
  k) dividing said memory line into sector data portions and implementing said directory structure for retrieving associated header and trailer data,
  l) attaching said headers and trailers to respective sector data portions to form said sectors, and transferring said sectors to said host.

40. The method for servicing data read and write requests as claimed in claim 39, wherein said step of implementing said directory structure for retrieving associated header and trailer data includes checking said first and second field entries to determine presence and location of said associated header and trailer data for each sector.

41. The method for servicing data read and write requests as claimed in claim 39, wherein prior to the step of servicing a read request, the step of staging data segments from said mass memory storage device to said main memory device, said staging step comprising:

m) retrieving sectors belonging to each memory line from said mass memory storage device;
  n) detaching header and trailer data from said retrieved sectors;
  o) storing said sector data portions for each sector in said main memory device, and
  p) storing said associated header and trailer data for each sector separately in said main memory device.

* * * * *